(12) United States Patent
Hatakeyama et al.

(10) Patent No.: US 9,991,819 B2
(45) Date of Patent: Jun. 5, 2018

(54) POWER CONVERSION SYSTEM AND METHOD FOR DETECTING ISOLATED OPERATION OF THE SAME

(71) Applicant: Hitachi Information & Telecommunication Engineering, Ltd., Yokohama-shi, Kanagawa (JP)

(72) Inventors: Tomoyuki Hatakeyama, Tokyo (JP); Akira Kikuchi, Tokyo (JP); Fumikazu Takahashi, Yokohama (JP); Kimiaki Taniguchi, Yokohama (JP); Hirofumi Oyamada, Yokohama (JP)

(73) Assignee: Hitachi Information & Telecommunication Engineering, Ltd., Yokohama-shi (JP)

( * ) Notice: Subject to any disclaimer, the term of this patent is extended or adjusted under 35 U.S.C. 154(b) by 253 days.

(21) Appl. No.: 14/519,791

(22) Filed: Oct. 21, 2014

(65) Prior Publication Data

US 2015/0109836 A1   Apr. 23, 2015

(30) Foreign Application Priority Data

Oct. 22, 2013  (JP) ................. 2013-219205

(51) Int. Cl.
*H02J 3/38* (2006.01)
*H02M 7/537* (2006.01)
*H02M 1/42* (2007.01)

(52) U.S. Cl.
CPC .......... *H02M 7/537* (2013.01); *H02J 3/381* (2013.01); *H02M 1/4208* (2013.01); *H02J 2003/388* (2013.01)

(58) Field of Classification Search
CPC .. H02J 3/381; H02J 2003/388; H02M 1/4208; H02M 7/537
See application file for complete search history.

(56) References Cited

U.S. PATENT DOCUMENTS 7,225,087 B1 *   5/2007   Siciliano ............... H02J 3/38
                                                    702/58
2008/0122293 A1*  5/2008   Ohm .................... H02J 3/383
                                                    307/86

(Continued)

FOREIGN PATENT DOCUMENTS

JP    2009-11037 A    1/2009
JP    2009-44910 A    2/2009

OTHER PUBLICATIONS

Margaret Rouse, What is logic gate (AND, OR, XOR, NOT, NAND, NOR and XNOR)? Article [online]. Jan. 2011 [retrieved on Oct. 19, 2016]).*

(Continued)

*Primary Examiner* — Robert E Fennema
*Assistant Examiner* — Marzia T Monty
(74) *Attorney, Agent, or Firm* — Crowell & Moring LLP

(57) ABSTRACT

A power conversion system is capable of distinguishing easily and clearly between being interconnected to the power system and being in an isolated operation. The power conversion system converts DC power to AC power to interconnect with a power system and injects reactive power into a grid node for determining an isolated operation, including: a voltage detector that detects an output voltage at the grid node; a current detector that detects an output current at the grid node; a frequency measurement unit that measures a frequency of the output voltage at the grid node; a reactive-power measurement unit that measures reactive power at the grid node; and an isolated-operation determination unit that determines whether or not the power conversion system is in an isolated operation as disconnected from the power system. The isolated-operation determination unit includes a reactive-power-fluctuation determina- (Continued)

tion unit that performs a first isolated-operation determination from the reactive power.

9 Claims, 16 Drawing Sheets

(56) References Cited

U.S. PATENT DOCUMENTS

| | | | | |
|---|---|---|---|---|
| 2008/0204044 A1* | 8/2008 | Ponnaluri | ................. | H02J 3/38 |
| | | | | 324/647 |
| 2011/0115301 A1* | 5/2011 | Bhavaraju | ................. | H02J 3/38 |
| | | | | 307/86 |
| 2012/0326511 A1* | 12/2012 | Johnson | ................. | H02J 3/383 |
| | | | | 307/52 |

OTHER PUBLICATIONS

Mabuchi, Masao, JP 2009044910 A, Feb. 2009, [FOR reference provided in IDS, however, examiner retrieved this machine translation version from STIC service within the office; texts are highlighted by examiner].*

"New Energy Technology Research and Development: Technology Research and Development on Interconnection Test of Multiple Devices for Detecting Isolated Operation," New Energy and Industrial Technology Development Organization, Feasibility Studies and Demonstration Projects H20 (2008) to H21 (2009), Mar. 2010, including partial English translation (five (5) pages).

* cited by examiner

Time (s)

POWER CONVERSION SYSTEM AND METHOD FOR DETECTING ISOLATED OPERATION OF THE SAME

TECHNICAL FIELD

The present invention relates to a power conversion system that accommodates power between various distributed power sources and a power system, and a method for detecting isolated operation of a power conversion system.

BACKGROUND ART

In recent years, various kinds of power conversion systems, each accommodating power between distributed power sources represented by solar power, wind power, or the like and a power system, have been interconnected in quantity to the power system. Thus, there is a concern that when a failure occurs in the power system, these power conversion systems may be disconnected simultaneously to cause a large power failure. Therefore, the power conversion system is required to include a function of continuous operation at a system failure. The function of continuous operation at a system failure refers to a function that, when a voltage of the power system is increased or decreased, or a frequency of the power system is increased or decreased, a power conversion system maintains a connection with the power system for a predetermined time.

There is a concern that, when the power system is stopped due to a failure in the system, these power conversion systems may have a state of isolated operation to continuously supply power to local system loads. It is because if the state of isolated operation is left untreated, workers may suffer electric shock or a restoration work of the power system may be disturbed. The power conversion system connected to the power system is required to include a device for detecting a state of isolated operation in order to prevent an isolated operation, and in case of transitioning to the state of isolated operation, to stop its operation quickly.

Japanese Patent Application Publication No. 2009-011037 and Japanese Patent Application Publication No. 2009-044910 disclose an exemplary method for detecting the isolated operation, namely a frequency shift method with step injection.

Japanese Patent Application Publication No. 2009-011037 describes in paragraph 0009 under Solution to Problems "A method for detecting an isolated operation according to the present invention, that is, the method for detecting an isolated operation which injects reactive power to the power system for the detection of whether or not a distributed power supply is disconnected from the power system to operate in an isolated state, is characterized that, when a system voltage is changed while in a state of no substantial change in the system frequency over a plurality of system cycles in the past, reactive power is injected into the system."

Japanese Patent Application Publication No. 2009-011037 describes in paragraph 0010 "When two conditions: first, there is no substantial change in the system frequency over a plurality of system cycles in the past; and second, the system voltage fluctuates if an isolated operation occurs, are satisfied, reactive power is injected to actively break a state of balance with respect to the above-described reactive power, and then, as a result, power fluctuation is caused in the power system to allow an isolated operation to be surely detected."

Japanese Patent Application Publication No. 2009-044910 describes under Solution to Problems "a first step that, when an isolated operation occurs, defines in advance a harmonic change pattern of harmonics changing over a plurality of system cycles in the past; a second step that determines whether or not measured harmonics exhibit changes corresponding to the harmonic change pattern; and a third step that, when it is determined that the measured harmonics exhibit changes corresponding to the harmonic change pattern, deems that harmonic fluctuation exists to inject reactive power, - - - ."

Thus, the frequency shift method with step injection increases, in a positive feedback manner, a command value of the reactive power according to the frequency deviation to activate fluctuation in the frequency. With a power conversion system using the frequency shift method with step injection, the frequency does not fluctuate when it is connected to the power system, while the frequency fluctuates in an isolated operation. Thus, the power conversion system can determine whether or not operating in an isolated mode.

Non-Patent Document of "New energy technology research and development: Technology research and development on interconnection test of multiple devices for detecting Isolated operation", New Energy and Industrial Technology Development Organization, Feasibility Studies and Demonstration Projects H20 (2008) to H21 (2009), March in H 22 (2010), online, searched on Sep. 30, 2013, describes in page 90 "Frequency feedback function is a function in which reactive power is injected so as to encourage frequency changes. A first stage gain and a second stage gain are provided so as not to inject large reactive power at slight fluctuation in the frequency during a normal operation, however, when reactive power is injected up to near plus or minus 1 kvar in the second stage gain, the frequency changes much. (snip) For a first specimen, detection of an isolated operation is performed using four detection threshold values."

As shown in FIG. 4.1.1-19 in the above mentioned Non-Patent Document, multiple threshold values are provided for the frequency deviation. In this algorithm, a time is measured after the deviation exceeds the threshold value, and if the deviation exceeds the threshold value for a predetermined time, it is determined that an isolated operation is being performed.

SUMMARY OF THE INVENTION

Problems to be Solved

In the prior art as described above, the power conversion system makes the frequency of the output voltage fluctuated to detect an isolated operation, and, when this fluctuation in the frequency satisfies a predetermined condition, determines to be in an isolated operation.

However, even in a state of being interconnected to the power system, there is a case where the frequency of the power system fluctuates so as to satisfy the above condition. According to the determination method as described in the prior art, the power conversion system, when it is interconnected to the power system and detects fluctuation in the frequency of the power system, may determine incorrectly to be in a state of isolated operation to disconnect from the power system. Thus, the power conversion system may not be able to meet the requirement for fluctuation in the frequency to continue an operation.

To avoid this situation, there can be an idea of fluctuating the frequency so as to exceed a required range of fluctuation in the frequency of the power system to continue the operation. However, according to this method, when the required range of fluctuation in the frequency is wide to continue an operation, the frequency needs to be significantly fluctuated to cause a problem that a time becomes longer until a state of isolated operation is detected. In order to significantly fluctuate the frequency in a short time, a command of large reactive power may be given, but the interference to the system becomes significant in a state of being interconnected to the system, possibly to destabilize the system.

The above problem occurs because fluctuation in the frequency of the power system during being interconnected to the system cannot be clearly distinguished from fluctuation in the frequency caused by a function for detecting the isolated operation.

The present invention is intended to provide a power conversion system that is capable of distinguishing easily and clearly between being interconnected to the power system and being in an isolated operation, and a method for detecting an isolated operation of the power conversion system.

Solution to Problems

In the invention of a power conversion system as described in claim 1, DC power is converted to AC power to interconnect with a power system, and reactive power is injected into a grid node for determining an isolated operation. This power conversion system includes: a voltage detector that detects an output voltage at the grid node; a current detector that detects an output current at the grid node; a frequency measurement unit that measures a frequency of the output voltage at the grid node from a signal of the output voltage detected by the voltage detector; a reactive-power measurement unit that measures reactive power at the grid node based on the signal of the output voltage and a signal of the output current at the grid node; and an isolated-operation determination unit that determines whether or not the power conversion system is in an isolated operation as disconnected from the power system. The isolated-operation determination unit includes a reactive-power-fluctuation determination unit that performs a first isolated-operation determination from the reactive power which is measured by the reactive-power measurement unit.

In the invention of a method for detecting an isolated operation of a power conversion system as described in claim 11, the power conversion system, which converts DC power to AC power to interconnect with a power system and injects reactive power into the grid node for determining an isolated operation, includes: a voltage detector that detects an output voltage at the grid node; a current detector that detects an output current at the grid node; a frequency measurement unit that measures a frequency of the output voltage at the grid node from a signal of the output voltage signal detected by the voltage detector; a reactive-power measurement unit that measures reactive power at the grid node based on the signal of the output voltage and a signal of the output current at the grid node; an isolated-operation determination unit that determines whether or not the power conversion system is in an isolated operation as disconnected from the power system; a reactive-power-command calculation unit that commands reactive power depending on a deviation of the frequency of the output voltage from the grid node; and a reactive-power-injection determination unit that injects reactive power into the grid node for determining an isolated operation. The isolated-operation determination unit includes a reactive-power-fluctuation determination unit. The reactive-power-fluctuation determination unit executes: a step for obtaining a command value of the reactive power by the reactive-power-command calculation unit; a step for obtaining a measured value of the reactive power of the grid node by the reactive-power measurement unit; and a step for determining whether or not an absolute value of a difference between the command value of the reactive power and the measured value exceeds a predetermined value to determine whether or not in an isolated operation.

In this manner, the power conversion system of the present invention, when it has transitioned to a state of isolated operation, can determine promptly that it is in an isolated operation, and when it is interconnected to the power system and the frequency of the power system has fluctuated, can avoid determining incorrectly that it is in an isolated operation. This allows providing a power conversion system that improves reliability of both a function of detecting an isolated operation and a function of continuing operation at a failure in the power system.

In addition, the power conversion system of the present invention can reduce interference to the power system, and reduce a time to detect an isolated operation.

Advantageous Effects of the Invention

The present invention allows providing a power conversion system that is capable of distinguishing easily and clearly between being interconnected to the power system and being in an isolated operation, and a method for detecting an isolated operation of the power conversion system.

EMBODIMENTS OF THE INVENTION

Hereinafter, a description will be given in detail of embodiments to implement the present invention and of a comparative example, with reference to respective drawings.

Figure 1:
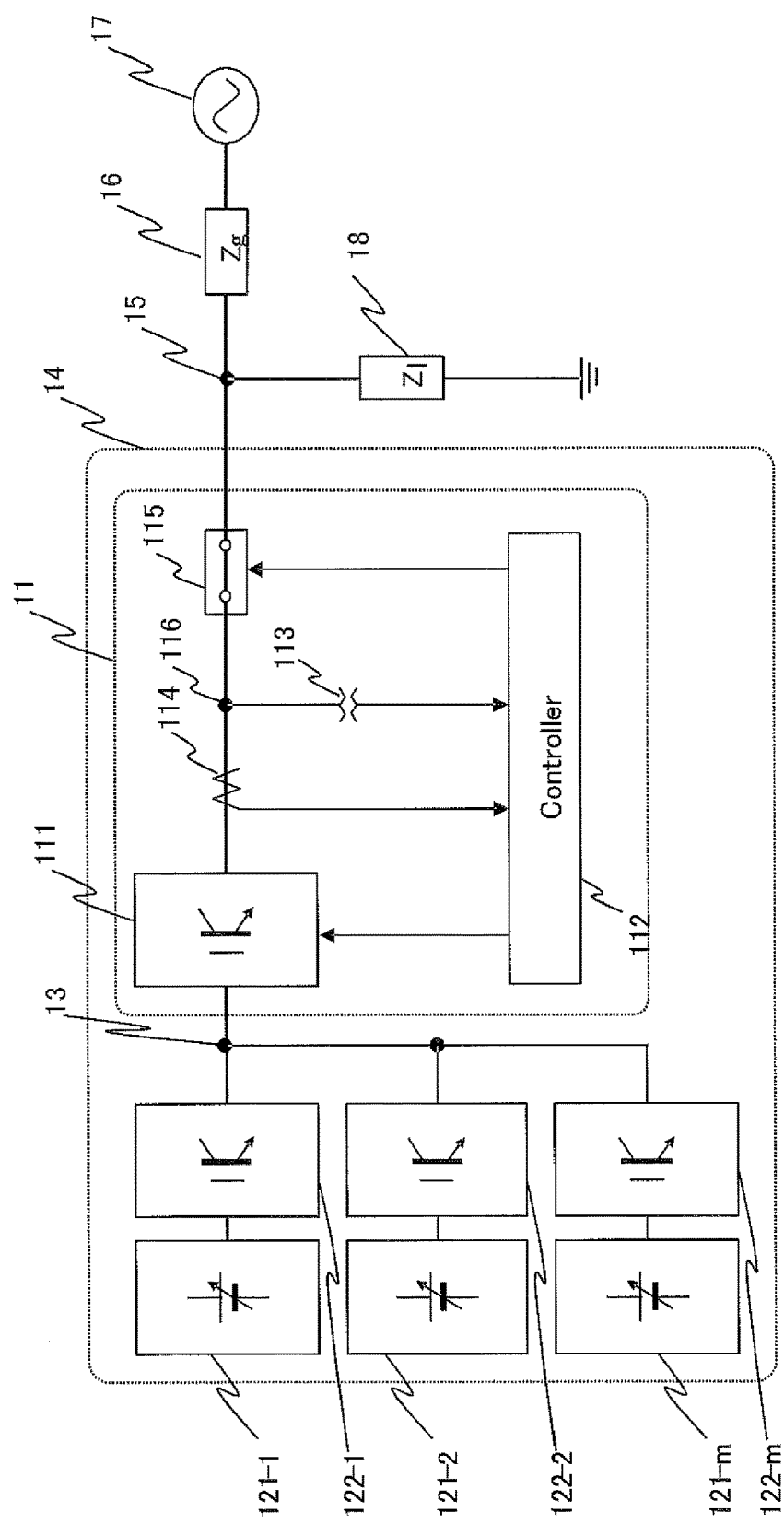
FIG. 1 is a schematic view of configuration showing a power conversion system.

FIG. 1 is a schematic view of configuration showing configurations of a distributed power supply system 14 and a power conversion system 11 included therein.

As shown in FIG. 1, the distributed power supply system 14 is configured to include the power conversion system 11, a plurality of distributed power supplies 121-1 to 121-$m$, and a plurality of DC/DC converters 122-1 to 122-$m$.

The plurality of distributed power supplies 121-1 to 121-$m$ are, for example, DC power sources, such as solar panels, storage batteries, electric vehicles and fuel cell vehicles. The DC/DC converters 122-1 to 122-$m$ are, for example, one-way insulated DC/DC converters, bidirectional insulated DC/DC converters and non-insulated DC/DC converters. The plurality of distributed power supplies 121-1 to 121-$m$ are connected to a DC feeding point 13 via the DC/DC converters 122-1 to 122-$m$, respectively. The DC feeding point 13 is connected to a terminal at a DC side of a power converter 111 in the power conversion system 11. Thus, DC power supplied from the distributed power supplies 121-1 to 121-$m$ is converted by the DC/DC converters 122-1 to 122-$m$, respectively, to a predetermined voltage to be supplied to the power conversion system 11. The power conversion system 11 converts DC power to AC power to interconnect with the power system 17, for supplying converted AC power to a load (not shown) such as a general home appliance.

Those connected to the power conversion system 11 may not be limited to DC power sources as described above, and may be a combination of AC power generators represented by wind power generators, diesel power generators or the like, and AC/DC converters for rectifying AC power generated by the AC power generators, respectively, into DC power.

The power conversion system 11 is configured to include a power converter 111, a controller 112, a voltage detector 113, a current detector 114, and a relay 115.

A grid node 116, which is a terminal at an AC side of the power converter 111, is connected from the voltage detector 113 and the current detector 114, and connected to an interconnection point 15 via the relay 115. The power converter 111 is for converting DC power to AC power.

The voltage detector 113 detects an output voltage at the grid node 116, which is at an AC side of the power conversion system 11, to transmit a signal of the output voltage to the controller 112. The current detector 114 is, for example, a current transformer, for detecting an output current at the grid node 116, which is at the AC side of the power conversion system 11, to transmit a signal of the output current to the controller 112. The controller 112 calculates the signal of the output voltage and the signal of the output current, which have been transmitted to the grid node 116, to control the power converter 111, and controls the output voltage and the output current at the grid node 116.

The grid node 116, which is a terminal at the AC side of the power conversion system 11, is connected to the interconnection point 15 of the power system 17. The interconnection point 15 is, for example, connected to the power system 17 via a system impedance 16, which is an impedance of a line. The interconnection point 15 may be connected from a plurality of distributed power supply systems 14.

A load 18 is, for example, a general home appliance owned by a power consumer. The load 18 is connected to the interconnection point 15, for AC power to be supplied from the power conversion system 11 and the power system 17.

Comparative Example

Figure 15:
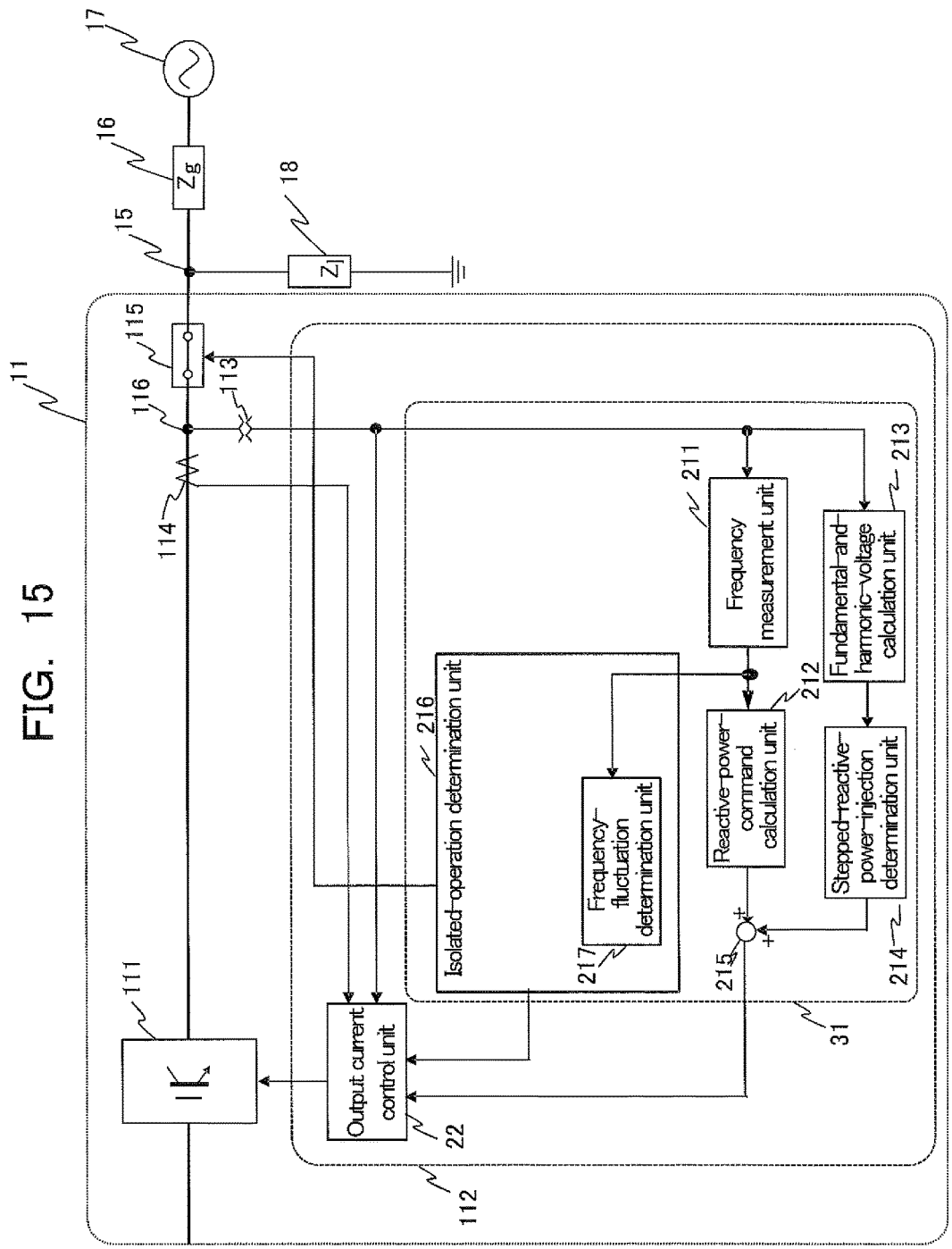
FIG. 15 is a schematic view of configuration showing an isolated-operation detection unit in a comparative example.

FIG. 15 is a diagram for explaining a configuration of an isolated-operation detection unit 21 of the power conversion system 11 in the comparative example. The same elements as the power conversion system 11 shown in FIG. 1 will be denoted by the same reference numerals, and the description thereof will be omitted.

As shown in FIG. 15, the controller 112 of the power conversion system 11 in the comparative example is, for example, configured with a microcomputer, to include an isolated-operation detection unit 21 and an output current control unit 22.

The isolated-operation detection unit 21 is configured to include a frequency measurement unit 211, a reactive-power-command calculation unit 212, a fundamental-and-harmonic-voltage calculation unit 213, a stepped-reactive-power-injection determination unit 214, an adder 215, and an isolated-operation determination unit 216. The isolated-operation detection unit 21 adopts a structure of a frequency feedback method with step infusion, to inject reactive power into the grid node 116 to detect that the power conversion system 11 itself is in isolated operation without interconnection with the power system 17.

The control unit 112 calculates a frequency deviation at the grid node 116 in a predetermined system cycle based on the frequency at the grid node 116 measured, and calculates reactive power to be injected into the grid node 116 based on the frequency deviation at the grid node 116 calculated. While injecting the reactive power calculated into the grid node 116, the controller 112 further determines, based on a voltage and a frequency at the grid node 116 measured, whether or not a condition has been satisfied that a state continues in which the deviation of the frequency at the grid node 116 is continuously less than a certain value over a predetermined number of system cycles not to have a substantial change in the frequency at the grid node 116, and that the voltage at the grid node 116 has been suddenly changed in magnitude exceeding a predetermined voltage fluctuation range. If this condition has been satisfied, the controller 112 performs a control to inject additional reactive power, in addition to the reactive power already being injected.

The controller 112, if it is configured with a microcomputer, for example, includes a CPU (Central Processing Unit), a memory, an interface, and the like. This memory stores a software program to implement a method for detecting an isolated operation in the comparative example.

The CPU, based on the signal of the output voltage and the signal of the output current at the grid node 116 inputted via the interface, executes various arithmetic operations, and, based on the results of the execution, outputs a switching command for the relay 115 via the interface, and outputs a command value for a current control to the power converter 111.

The frequency measurement unit 211, based on the voltage signal inputted from the voltage detector 113, sequentially measures a frequency of the voltage signal at the grid node 116 in a unit of a predetermined measurement cycle, for example, in a unit of 5 ms. Note that, assuming that the system frequency of the power system 17 is 50 Hz (one system cycle is 20 ms), a unit of measurement cycle of the frequency measurement unit 211 is desired to be less than one third of the system cycle of the power system 17, for example, a unit of 5 ms. A frequency signal measured by the frequency measurement unit 211 is inputted to the reactive-power-command calculation unit 212 and the isolated-operation determination unit 216.

The reactive-power-command calculation unit 212, based on the frequency signal inputted from the frequency measurement unit 211, calculates a deviation of the frequency at the grid node 116, and, according to the deviation of the frequency calculated, calculates a command value of the reactive power to be injected into the grid node 116. Thus, during an isolated operation, the reactive-power-command calculation unit 212 can increase a command value of the reactive power in a positive feedback manner, according to the deviation of the frequency.

The fundamental-and-harmonic-voltage calculation unit 213, based on the voltage signal at the grid node 116 inputted from the voltage detector 113, calculates the fundamental and harmonic of the voltage at the grid node 116. The fundamental and harmonic calculated is inputted to the stepped-reactive-power-injection determination unit 214.

The stepped-reactive-power-injection determination unit 214, based on the fundamental and harmonic of the voltage at the grid node 116, when a state continues in which the deviation of the frequency at the grid node 116 is continuously less than a certain value over a predetermined number of system cycles not to have a substantial change in the frequency at the grid node 116, and the voltage at the grid node 116 has been suddenly changed in magnitude exceeding a predetermined voltage fluctuation range, performs a control to inject additional reactive power.

The adder 215 adds the command value of the reactive power inputted from the reactive-power-command calculation unit 212, and additional reactive power inputted from the stepped-reactive-power-injection determination unit 214, to generate a command value of the reactive power for a control of the output current.

The isolated-operation determination unit 216 includes a frequency-fluctuation determination unit 217 that determines an isolated operation from fluctuation in the frequency. The frequency-fluctuation determination unit 217 calculates fluctuation in the frequency from frequency signals inputted from the frequency measurement unit 211, and, based on the fluctuation in the frequency, determines whether or not to be in an isolated operation (a second isolated-operation determination). In the power conversion system 11 of the comparative example, the frequency of the output voltage at the grid node 116 does not fluctuate while being connected to the power system 17, whereas the frequency of the output voltage at the grid node 116 fluctuates while being in an isolated operation. Thus, the isolated-operation determination unit 216 can determine whether or not the power conversion system itself is in an isolated operation. When it is determined that the power conversion system itself is in an isolated operation, the isolated operation determination unit 216 turns off the relay 115 to output a stop signal to the power converter 111.

Based on a signal of the output current at the grid node 116 detected by the current detector 114, a signal of the output voltage at the grid node 116 detected by the voltage detector 113, and a command value of the reactive power for controlling a power current inputted from the adder 215, the output current control unit 22 controls the power converter 111 to control the reactive power to be injected into the grid node 116. Further, the output current control unit 22, based on a stop signal inputted from the isolated-operation determination unit 216, stops its own operation.

Figure 16:
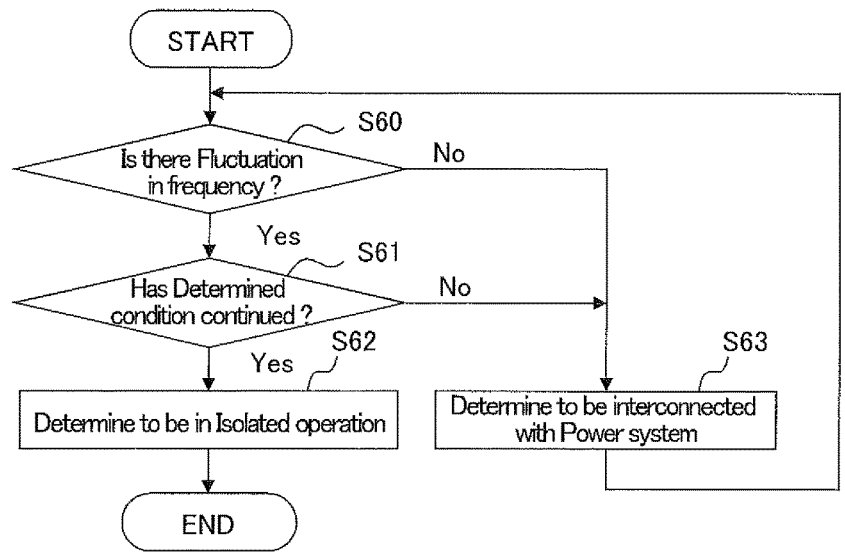
FIG. 16 is a flowchart showing an isolated-operation determination process in the comparative example.

FIG. 16 is a flowchart of the isolated-operation determination process by the isolated-operation determination unit 216 in the comparative example.

Once the power conversion system 11 in the comparative example is activated, the isolated-operation determination unit 216 start the isolated-operation determination process.

In step S60, the isolated-operation determination unit 216 determines fluctuation in the frequency at the grid node 116. The isolated-operation determination unit 216, if determined that there is fluctuation in the frequency (Yes), performs processing in step S61, while if determined that there is no fluctuation in the frequency (No), performs processing in step S63.

In step S61, the isolated-operation determination unit 216 determines whether or not the determination condition has continued over a predetermined period of time. The isolated-operation determination unit 216, if determined that the determination condition has continued over a predetermined period of time (Yes), performs processing in step S62, while if determined that the determination condition has not continued over a predetermined period of time (No), performs processing in step S63.

In step S62, the isolated-operation determination unit 216, after determining that the power conversion system itself is in an isolated operation (the second isolated-operation determination) and turning off the relay 115 to output a stop signal to the power converter 111, ends the process in FIG. 16.

In step S63, the isolated-operation determination unit 216 determines that the power conversion system itself is interconnected with the power system 17 to return processing in step S60.

When transitioning to an isolated operation, the frequency at the grid node 116 may fluctuate due to a control by the isolated-operation detection unit 21. The isolated-operation determination unit 216 determines by the frequency-fluctuation determination unit 217, when fluctuation in the frequency at the grid node 116 satisfies the predetermined condition, that the power conversion system is in an isolated operation.

Figure 17:
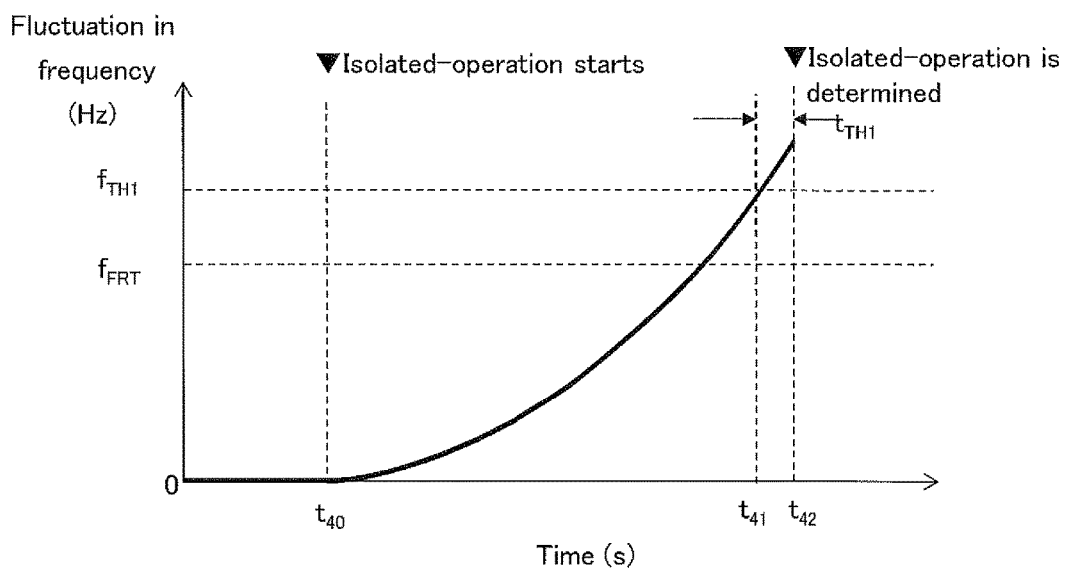
FIG. 17 is a chart showing an operation of determining an isolated operation in the comparative example.

FIG. 17 is a chart showing an operation of determining an isolated operation in the comparative example. The vertical axis in FIG. 17 indicates fluctuation in the frequency at the grid node 116. The horizontal axis in FIG. 17 indicates the time.

Before time $t_{40}$, the power conversion system 11 is interconnected to the power system 17. At this time, the deviation of the frequency at the grid node 116 is small, and reactive power is small that is injected into the grid node 116 by the reactive-power-command calculation unit 212. At this time, the reactive power injected into the grid node 116 does not cause deviation of the frequency at the grid node 116, but increases the reactive power at the grid node 116 instead.

At time $t_{40}$, the power conversion system 11 transitions to a state of isolated operation. The reactive-power-command calculation unit 212 injects reactive power depending on the deviation of the frequency at the grid node 116. At this time, the reactive power injected into the grid node 116 does not cause the reactive power at the grid node 116 to be increased, but causes a deviation of the frequency at the grid node 116 instead. That is, the frequency at the grid node 116 fluctuates depending on the reactive power injected, to increase in a positive feedback manner.

At time $t_{41}$, the frequency-fluctuation determination unit 217 determines that fluctuation in the frequency measured at the grid node 116 by the frequency measurement unit 211 exceeds a threshold value $f_{TH1}$.

At time $t_{42}$, the frequency-fluctuation determination unit 217 determines that the fluctuation in the frequency at the grid node 116 has continued during a time $t_{TH1}$. Thus, the isolated-operation determination unit 216 determines that the power conversion system 11 is in a state of isolated operation, and disconnects the system from the power system 17 to output a stop signal to the power converter 111.

Here, the upper limit value is set to $f_{FRT}$ for the requirement for fluctuation in the frequency to continue an operation. In the case of determining the isolated operation only from fluctuation in the frequency at the grid node 116, for satisfying the requirement for fluctuation in the frequency to continue an operation, a determination of an isolated operation needs to be made after the fluctuation level exceeds the upper limit value $f_{FRT}$. That is, the threshold value $f_{TH1}$ must be set larger than the upper limit value $f_{FRT}$.

First Embodiment

Figure 2:
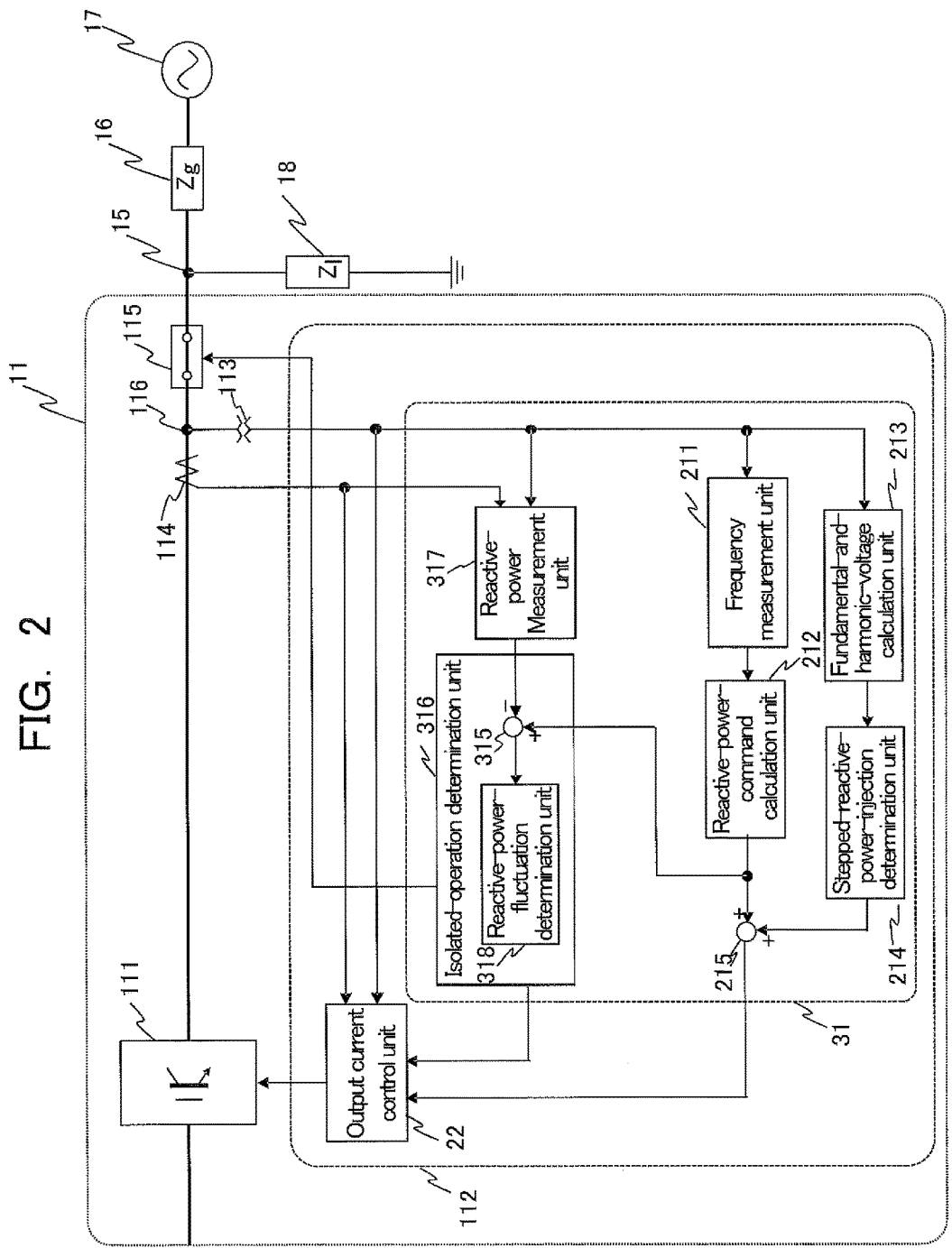
FIG. 2 is a schematic view of configuration showing an isolated-operation detection unit in a first embodiment.

FIG. 2 is a schematic view of configuration showing an isolated-operation detection unit 31 of the power conversion system 11 in the first embodiment. The same elements as those of the power conversion system 11 shown in FIG. 15 are denoted by the same reference numerals.

As shown in FIG. 2, the controller 112 of the power conversion system 11 in the first embodiment is configured to include an isolated-operation detection unit 31 which is different from that in the comparative example, and an output-current control unit 22 which is similar to that in the comparative example.

The isolated-operation detection unit 31 is configured to include a reactive-power measurement unit 317 and an isolated-operation determination unit 316, which are different from those in the comparative example, as well as a frequency measurement unit 211, a reactive-power-command calculation unit 212, a fundamental-and-harmonic-voltage calculation unit 213, a stepped-reactive-power-injection determination unit 214, and an adder 215, which are similar to those in the comparative example.

The reactive-power measurement unit 317 is designed to measure the reactive power at the grid node 116 from the signal of the output voltage and the signal of the output current, which are inputted to the grid node 116.

The isolated-operation determination unit 316 is configured to include a subtractor 315 and a reactive-power-fluctuation determination unit 318 which is different from the comparative example. The subtractor 315 subtracts a measured value of the reactive power from a command value of the reactive power. The reactive-power-fluctuation determination unit 318, from the reactive power inputted at the grid node 116, determines whether or not the power conversion system 11 itself is in an isolated operation as disconnected from the power system 17.

Figure 3A:
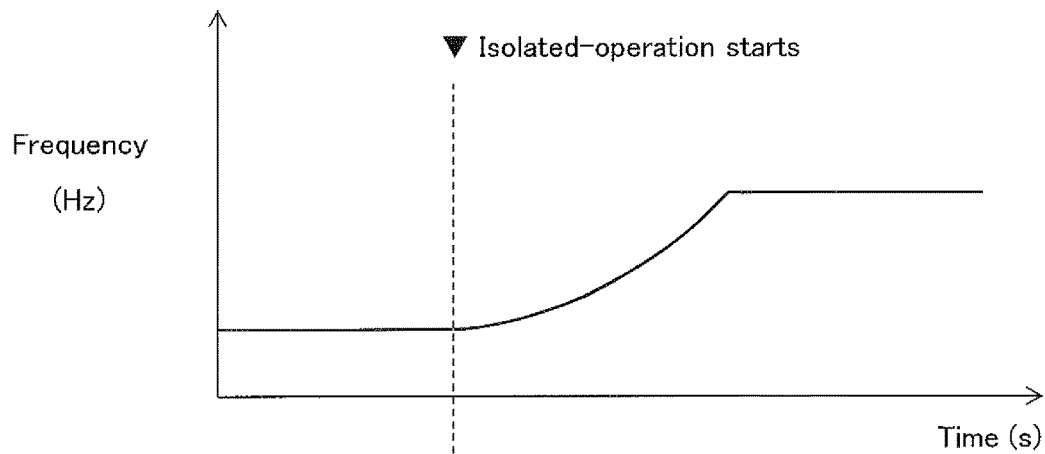
FIGS. 3A and 3B are charts showing temporal changes, in a state of isolated operation, of fluctuation in the frequency of the power system, and of a command value and a measured value of the reactive power.
Figure 3B:
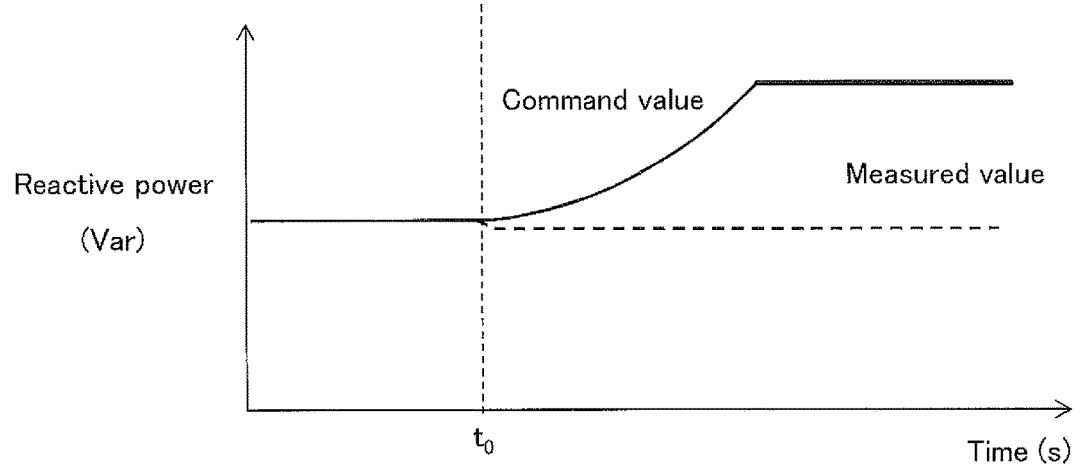

FIGS. 3A and 3B are charts showing an operation of determining an isolated operation by the isolated-operation detection unit 31. FIG. 3A is a chart illustrating fluctuation in the frequency at the grid node 116. The vertical axis in FIG. 3A indicates the frequency of the output voltage at the grid node 116. The horizontal axis in FIG. 3A indicates the time.

FIG. 3B is a chart illustrating temporal changes of a command value and a measured value of the reactive power. The vertical axis in FIG. 3A indicates the reactive power. The horizontal axis in FIG. 3B indicates the time corresponding to that in FIG. 3A. The solid line in the chart indicates the command value of the reactive power. The dashed line in the chart indicates the measured value of the reactive power.

Before time $t_0$, the power conversion system 11 is interconnected to the power system 17. At this time, as shown in FIG. 3A, a level of fluctuation in the frequency is small at the grid node 116, and as shown in FIG. 3B, a level of fluctuation is also small in the command value and the measured value of the reactive power.

At time $t_0$, the power conversion system 11 transitions to an isolated operation. At this time, in order to fluctuate the frequency at the grid node 116, the isolated-operation detection unit 31 outputs the command value of the reactive power to the output-current control unit 22.

Once the command value of the reactive power is inputted, the output-current control unit 22 changes a phase difference between the output voltage and the output current of the power conversion system 11. At this time, the power conversion system 11 has the load 18 directly connected, then the reactive current depends on the impedance of the load 18. If the impedance of the load 18 keeps having a predetermined value, the phase of the output voltage changes so as to follow the phase change of the output current. As a result, a cycle between zero cross points of the output voltage is changed to cause a frequency measured by the frequency measurement unit 211 to be changed.

Thus, in a state of isolated operation, an attempt to change the reactive power outputted from the power conversion system 11 causes the frequency of the AC voltage outputted from the power conversion system 11 to be changed. That is, the measured value of the reactive power outputted from the power conversion system 11 no longer follows the command value of the reactive power.

The isolated-operation detection unit 31 further increases the command value of the reactive power, as the level of fluctuation in the frequency increases at the grid node 116, to increase the level of fluctuation in the frequency in a positive feedback manner. Thus, the difference between the command value and the measured value of the reactive power increases over time. Eventually, when the command value of the reactive power reaches the predetermined upper limit value set in advance, the frequency at the grid node 116 does not fluctuate any more.

Figure 4A:
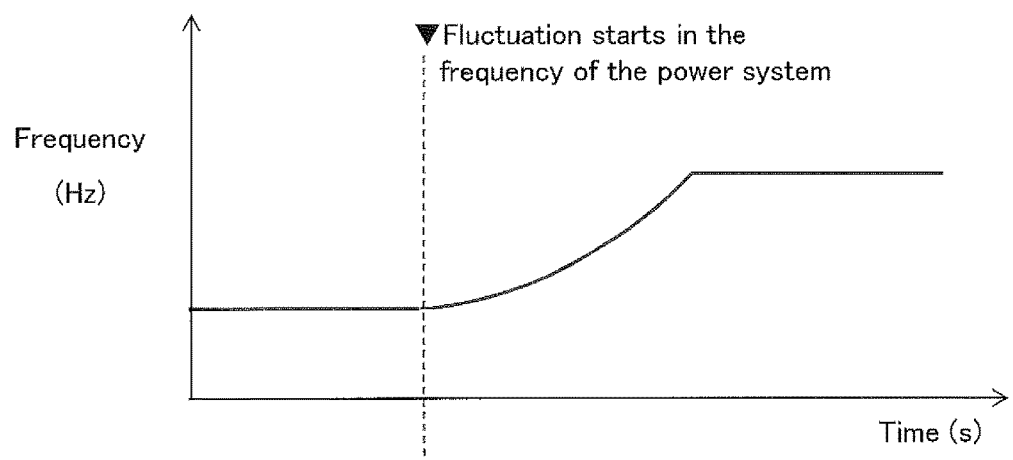
FIGS. 4A and 4B are charts showing temporal changes, in a state of being interconnected to the power system, of fluctuation in the frequency of the power system, and of a command value and a measured value of the reactive power.
Figure 4B:
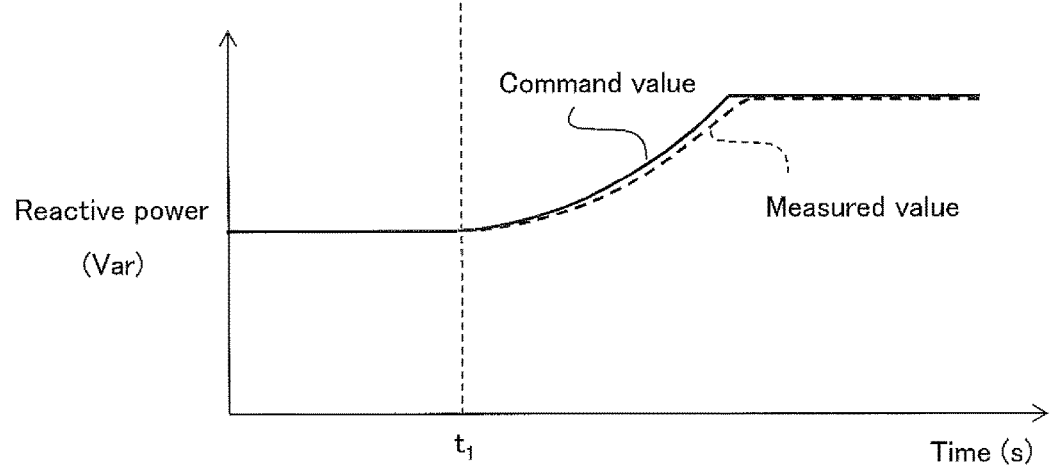

FIGS. 4A and 4B are charts illustrating a state of being interconnected with the power system 17.

FIG. 4A is a chart showing fluctuation in the frequency in a case where the frequency of the power system 17 fluctuates. The vertical axis in FIG. 4A indicates the frequency of the output voltage at the grid node 116. The horizontal axis in FIG. 4A indicates the time.

FIG. 4B is a chart illustrating temporal changes of a command value and a measured value of the reactive power. The vertical axis in FIG. 4B indicates the reactive power.

The horizontal axis in FIG. 4B indicates the time corresponding to that in FIG. 4A. The solid line in the chart indicates the command value of the reactive power. The dashed line in the chart indicates the measured value of the reactive power at the grid node 116.

At time $t_1$, fluctuation in the frequency at the grid node 116 begins to cause the isolated-operation detection unit 31 to vary the command value of the reactive power depending on the fluctuation in the frequency. The reactive power outputted from the power conversion system 11, when interconnected to the power system 17, is independent of the impedance of the load 18. Therefore, the power conversion system 11, by a control over the reactive power, outputs reactive power depending on the command value. That is, the measured value of the reactive power at the grid node 116 follows the command value of the reactive power. There is no or little difference generated between the command value of the reactive power and the measured value of the reactive power.

To summarize the discussion above, while the power conversion system 11 is in an isolated operation, there is a difference generated between the command value and the measured value of the reactive power. In contrast, while the power conversion system 11 is interconnected to the power system 17, even if the frequency of the power system 17 fluctuates, there is no or little difference generated between the command value and the measured value of the reactive power. The isolated-operation determination unit 316 according to the first embodiment calculates the absolute value of the difference between the command value and the measured value of the reactive power to determine whether or not the value exceeds a threshold value, and determines whether or not the power conversion system is in an isolated operation.

Figure 5:
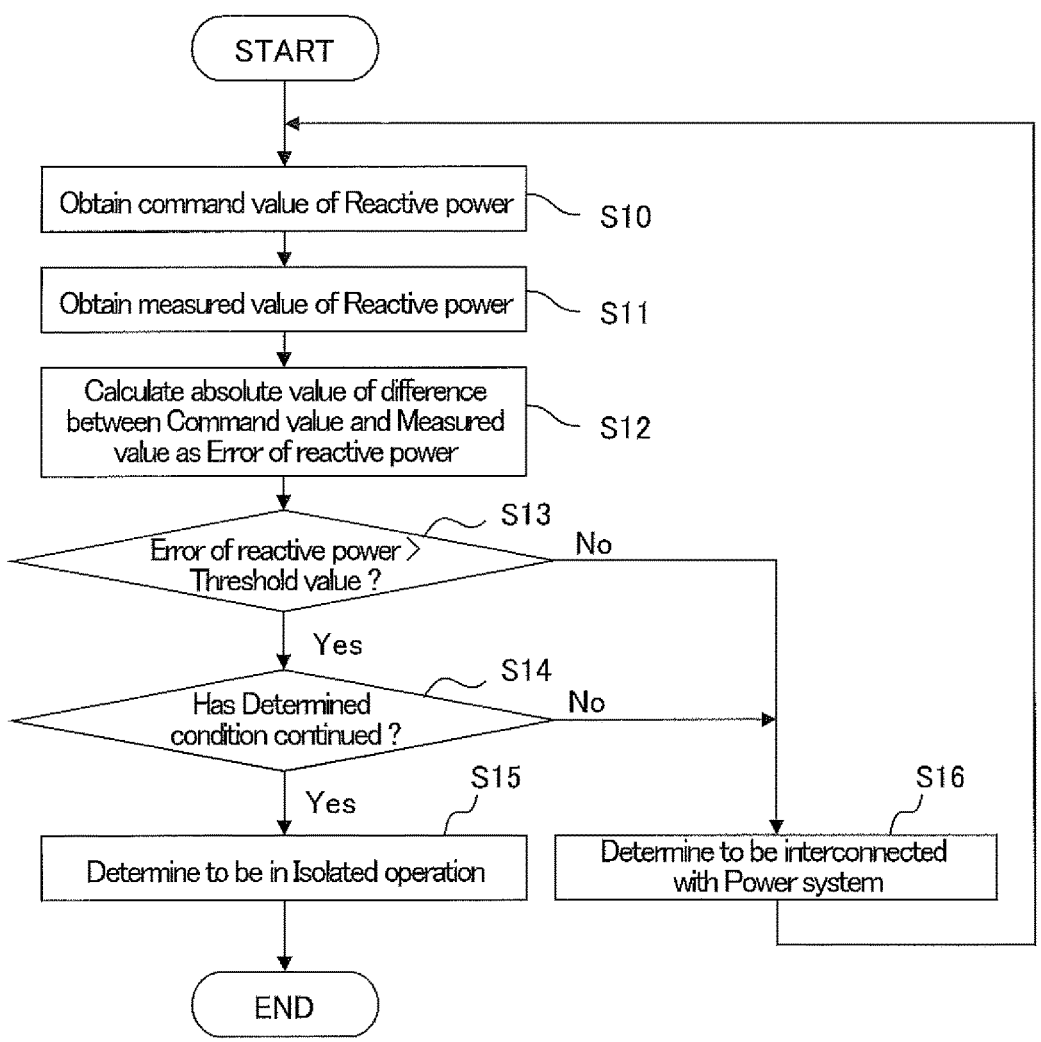
FIG. 5 is a flowchart showing a reactive-power determination process in the first embodiment.

FIG. 5 is a flowchart showing a reactive-power determination process in the first embodiment.

Once the power conversion system 11 according to the first embodiment is activated, the isolated-operation determination unit 316 starts a process for determining an isolated operation (first isolated-operation determination).

In step S10, the isolated-operation determination unit 316 obtains the command value of the reactive power from the reactive-power-command calculation unit 212.

In step S11, the isolated-operation determination unit 316 obtains the measured value of the reactive power at the grid node 116 from the reactive-power measurement unit 317.

In step S12, the isolated-operation determination unit 316 calculates the absolute value of the difference, by the subtractor 315, between the command value and the measured value of the reactive power, as an error of the reactive power.

In step S13, the isolated-operation determination section 316 determines whether or not the error of the reactive power exceeds the threshold value (first isolated-operation determination). The isolated-operation determination unit 316, if determined that the error of the reactive power exceeds the threshold value (Yes), performs processing in step S14, and if determined that the error of the reactive power does not exceed the threshold value (No), performs processing in S16.

In step S14, the isolated-operation determination unit 316 determines whether or not the determined condition has continued over a predetermined period of time. The isolated-operation determination unit 316, if the determined condition has continued over a predetermined period of time (Yes), performs processing in step S15, and if the determined condition has not continued over a predetermined period of time (No), performs processing in step S16.

In step S15, the isolated-operation determination unit 316 determines that the power conversion system itself is in an isolated operation, to turn off the relay 115 to output a stop signal to the power converter 111, and then ends the process in FIG. 5.

In step S16, the isolated-operation determination unit 316 determines that the power conversion system itself is interconnected with the power system 17 to return to the processing in step S10.

Figure 6A:
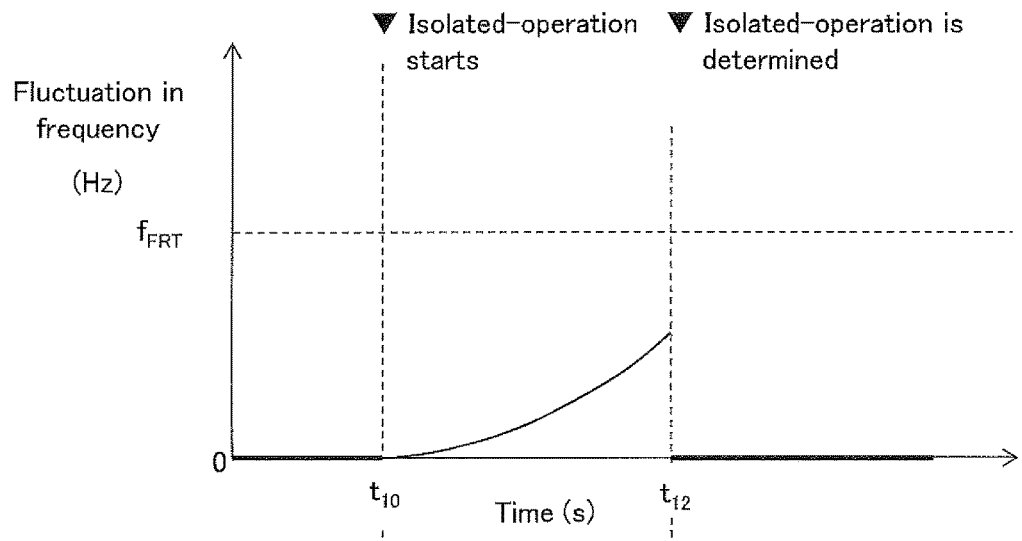
FIGS. 6A and 6B are charts showing an operation of determining an isolated operation in the first embodiment.
Figure 6B:
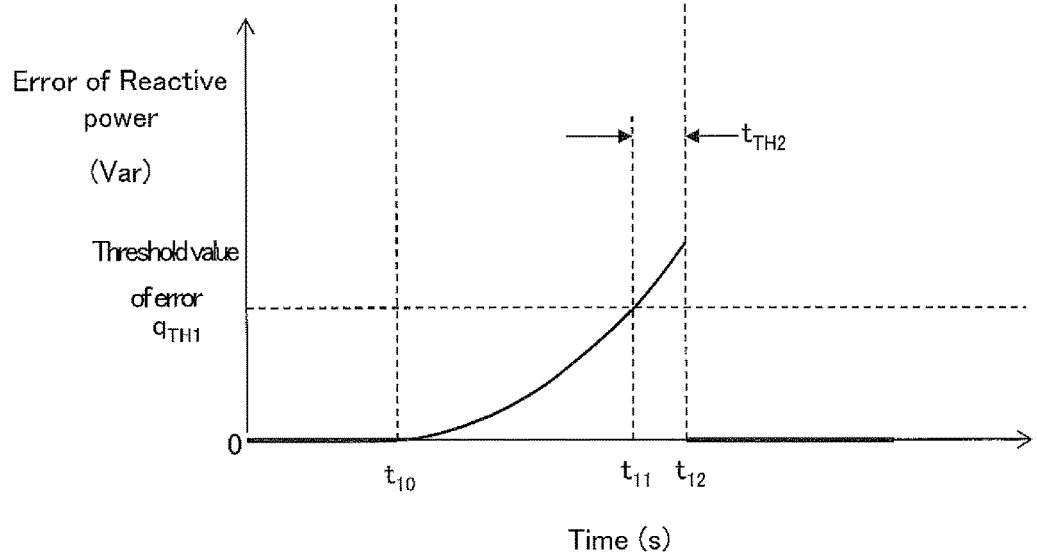

FIGS. 6A and 6B are charts showing an operation of determining an isolated operation in the first embodiment. FIG. 6A is a chart showing fluctuation in the frequency. The vertical axis in FIG. 6A indicates the fluctuation in the frequency at the grid node 116. The horizontal axis in FIG. 6A indicates the time.

FIG. 6B is a chart showing the error of the reactive power. The vertical axis in FIG. 6A indicates the error of the reactive power. The horizontal axis in FIG. 6B indicates the time corresponding to that in FIG. 6A.

At time $t_{10}$, the power conversion system 11 starts an isolated operation. After time $t_{10}$, since the isolated-operation detection unit 31 increases the fluctuation in the frequency at the grid node 116 in a positive feedback manner, the command value of the reactive power is increased. In a state of isolated operation of the power conversion system 11, the measured value of the reactive power at the grid node 116 depends on the impedance of the load 18. Normally, a time required for detecting an isolated operation is several hundred milliseconds at the longest. The impedance of the load 18 may not be changed rapidly in this short time, to maintain a predetermined value. Therefore, the error of the reactive power increases in a positive feedback manner.

At time $t_{11}$, the error of the reactive power exceeds the threshold value $q_{TH1}$.

At time $t_{12}$, the error of reactive power exceeds the threshold value $q_{TH1}$ over a time $t_{TH2}$. Then, the isolated-operation determination section 316 determines that the power conversion system itself is in an isolated operation, to disconnect the power conversion system 11 from the power system 17. In Japan, the upper limit value of the command value of the reactive power to determine a state of isolated operation is specified in the Japan Electrical Manufacturers' Association standards. This upper limit value allows the threshold value $q_{TH1}$ to be determined more appropriately.

Even before the fluctuation in the frequency at the grid node 116 reaches the upper limit value $f_{FRT}$ for requirement for fluctuation in the frequency to continue an operation, the power conversion system 11 according to the first embodiment can determine, from the reactive power at the grid node 116, to be in a state of isolated operation. This allows a determination to be made, when the fluctuation in the frequency is smaller than the comparative example, that transition to an isolated operation has occurred, to reduce the unnecessary interference with the power system 17, and to shorten a time for detecting an isolated operation.

The isolated-operation determination unit 316 includes a reactive-power fluctuation determination unit 318 to clearly distinguish between a state of being interconnected with the system and having fluctuation in the frequency of the power system 17, and a state of isolated operation. This allows reliability to be improved for the function of detecting an isolated operation and the function of continuing an operation at a system failure.

Second Embodiment

While being interconnected to the power system 17, the power conversion system 11 is injected with additional reactive power by the stepped-reactive-power-injection determination unit 214, to cause a predetermined deviation in the reactive power at the grid node 116. In contrast, while in an isolated operation, the deviation no longer occurs in the reactive power at the grid node 116 in the power conversion system 11. The second embodiment is designed to monitor the deviation of the reactive power at the grid node 116 to determine whether or not to be in an isolated operation.

Figure 7:
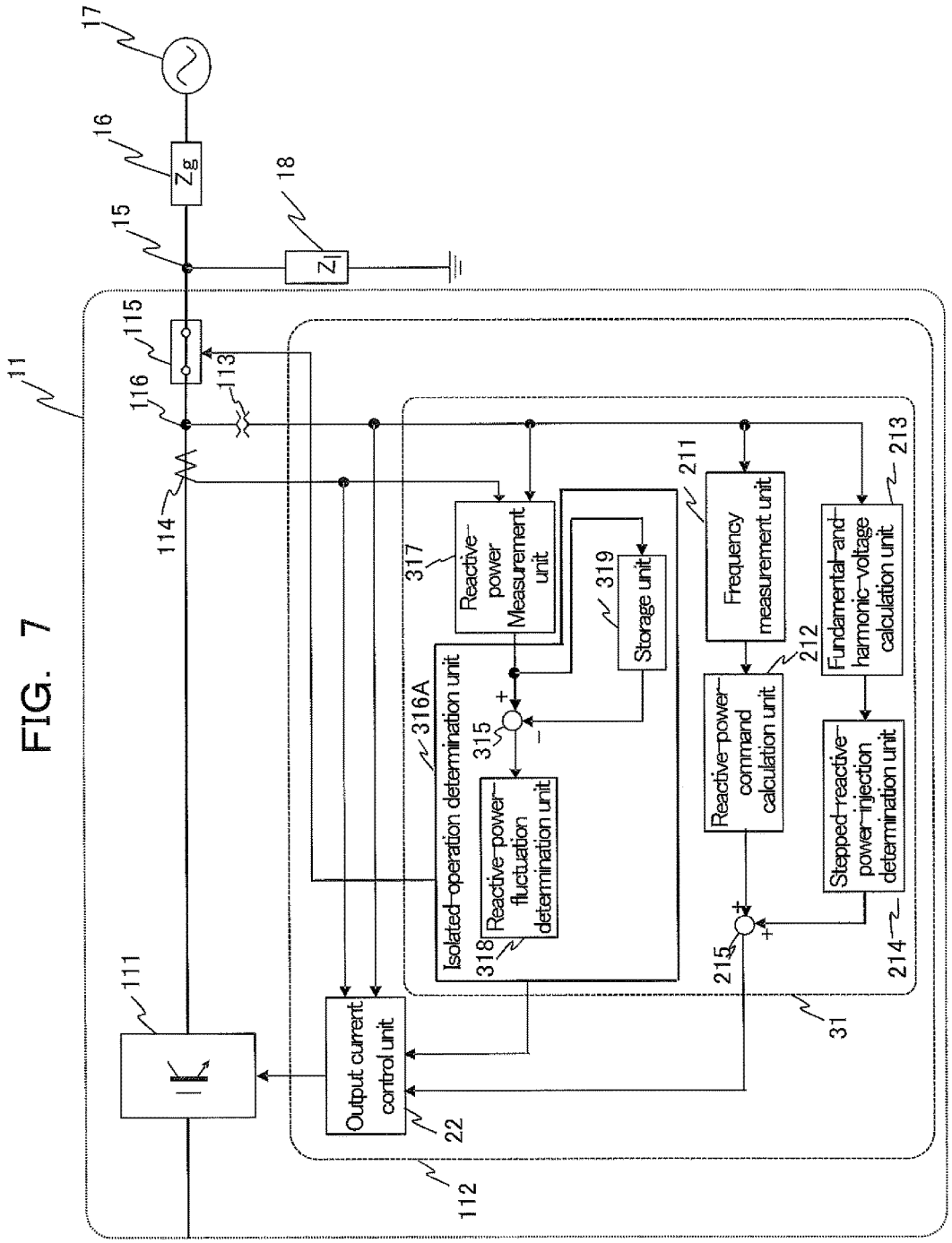
FIG. 7 is a schematic view of configuration showing an isolated-operation detection unit in a second embodiment.

FIG. 7 is a schematic view of configuration showing an isolated-operation detection unit 31 of the power conversion system 11 according to the second embodiment. The same elements as those of the power conversion system 11 of the first embodiment as shown in FIG. 2 are denoted by the same reference numerals.

As shown in FIG. 7, the isolated-operation detection unit 31 according to the second embodiment is configured to include an isolated-operation detection unit 316A which is different from that in the first embodiment, and the frequency measurement unit 211, the reactive-power-command calculation unit 212, the fundamental-and-harmonic-voltage calculation unit 213, the stepped-reactive-power-injection determination unit 214, the adder 215, and the reactive power measurement unit 317, which are same as those in the first embodiment.

The isolated-operation determination unit 316A is configured to include the subtractor 315 which is same as that in the first embodiment, and a reactive-power-fluctuation determination unit 318 which is different from that in the first embodiment, and further a storage unit 319.

Figure 8:
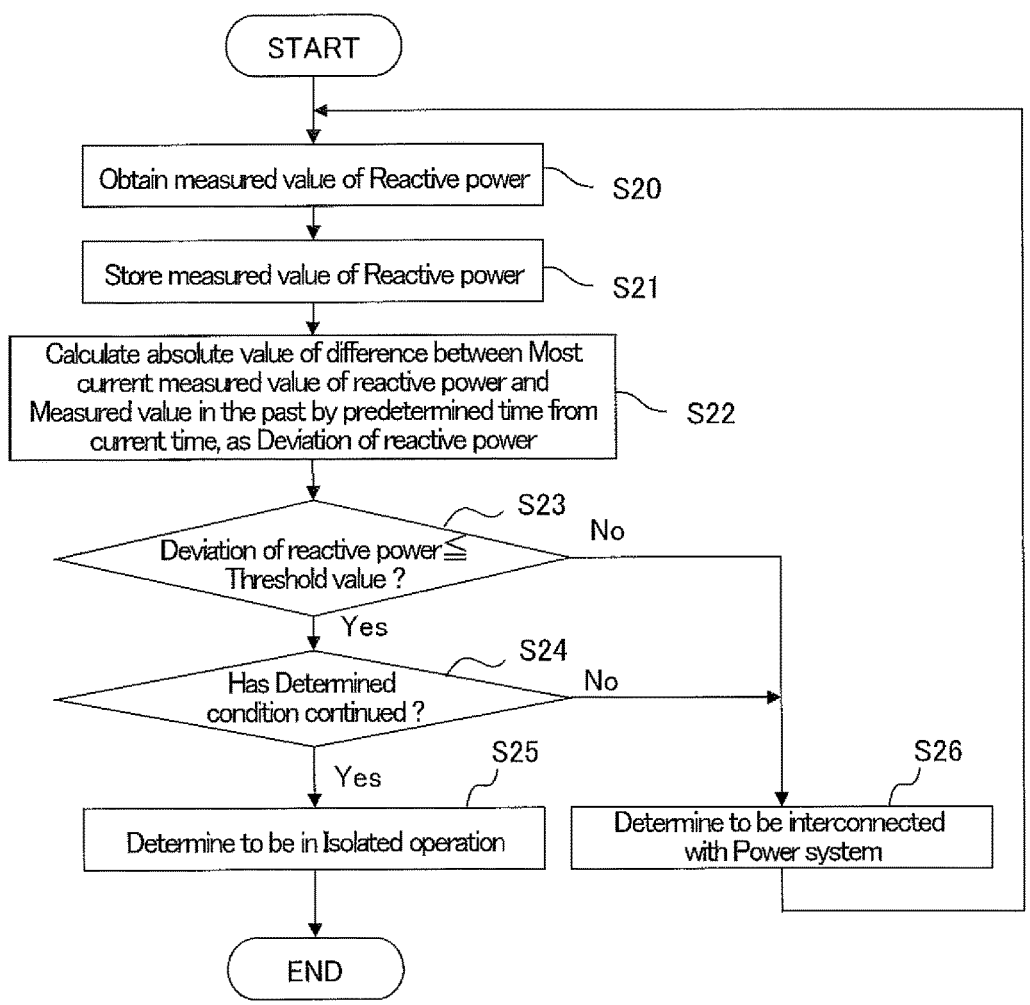
FIG. 8 is a flowchart showing a reactive-power determination process in the second embodiment.

FIG. 8 is a flowchart showing a reactive-power-fluctuation determination process by the isolated-operation determination unit 316A according to the second embodiment.

Once the power conversion system 11 of the first embodiment is activated, the isolated-operation determination unit 316A starts an isolated-operation determination process (first isolated-operation determination).

In step S20, the isolated-operation determination unit 316A obtains the measured value of the reactive power at the grid node 116 from the reactive-power measurement unit 317.

In step S21, the isolated-operation determination unit 316A stores the measured value of the reactive power at the grid node 116 in the storage unit 319.

In step S22, the isolated-operation determination unit 316A calculates the absolute value of the difference, by the subtractor 315, between the most current measured value of the reactive power and a measured value in the past by a predetermined time from the current time, as a deviation of the reactive power. The measured value in the past by a predetermined time from the current time is retrieved from the storage unit 319.

In step S23, the isolated-operation determination section 316A determines whether or not a deviation of the reactive power is less than or equal to a threshold value. The isolated-operation determination unit 316A, if a deviation of the reactive power is less than or equal to the threshold value (Yes), performs processing in step S24, and if a deviation of the reactive power is not less than or equal to the threshold value (No), performs processing in step S26.

In step S24, the isolated-operation determination unit 316A determines whether or not the determined condition has continued over a predetermined period of time. The isolated-operation determination unit 316A, if the determined condition has continued over a predetermined period of time (Yes), performs processing in step S25, and if the determined condition has not continued over a predetermined period of time (No), performs processing in step S26.

In step S25, the isolated-operation determination unit 316A determines that the power conversion system itself is in an isolated operation to turn off the relay 115 to output a stop signal to the power converter 111, and then ends the process in FIG. 8.

In step S26, the isolated-operation determination unit 316A determines that the power conversion system itself is interconnected with the power system 17, to return to the processing in step S20.

Figure 9A:
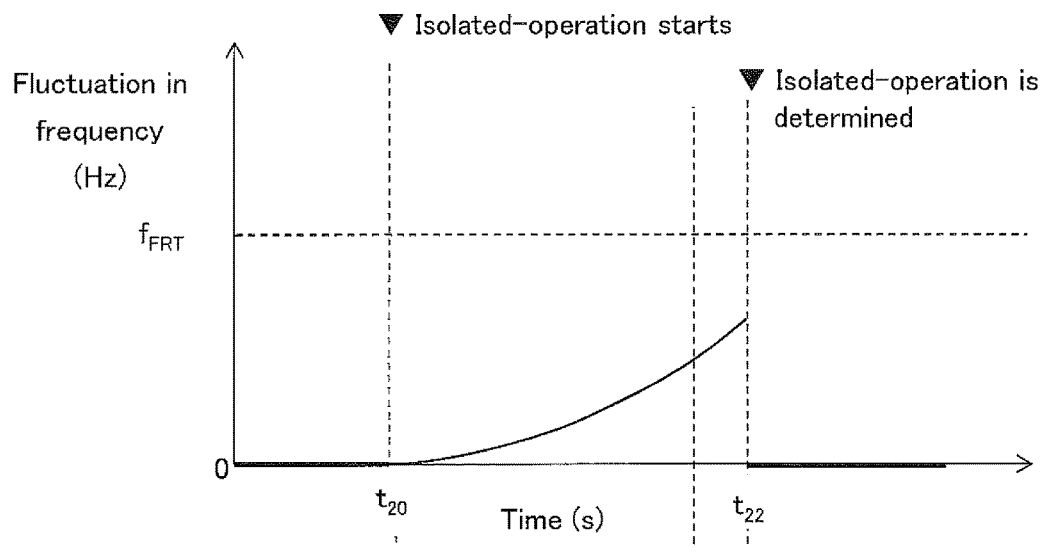
FIGS. 9A and 9B are charts showing an operation of determining an isolated operation in the second embodiment.
Figure 9B:
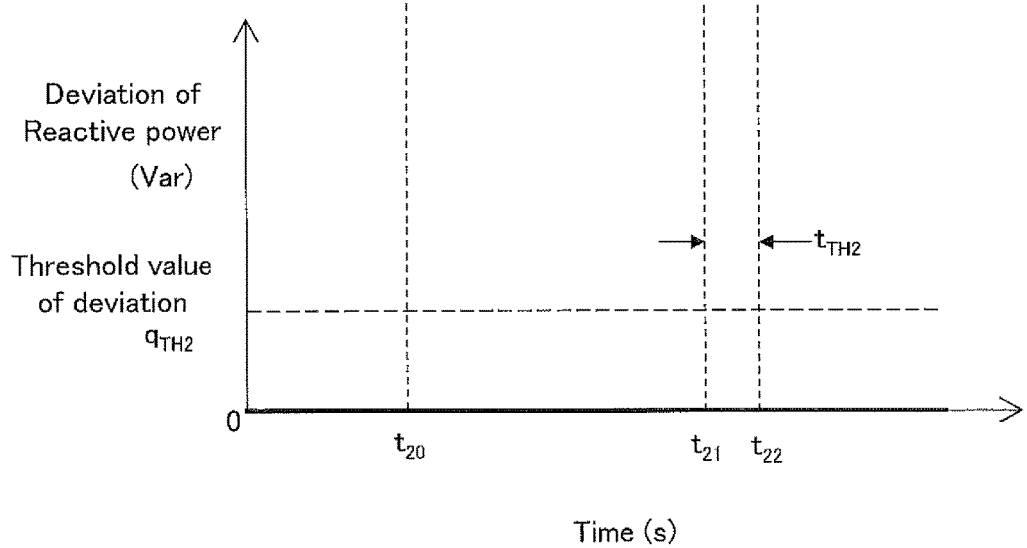

FIGS. 9A and 9B are charts showing an operation of determining an isolated operation in the second embodiment. FIG. 9A is a chart showing the fluctuation in the frequency. The vertical axis in FIG. 9A indicates the fluctuation in the frequency at the grid node 116. The horizontal axis in FIG. 9A indicates the time.

FIG. 9B is a chart showing the deviation of the reactive power. The vertical axis in FIG. 9B indicates the error of the reactive power. The horizontal axis in FIG. 9B indicates the time corresponding to that in FIG. 9A.

At time $t_{20}$, the power conversion system 11 starts an isolated operation.

As indicated in FIG. 3B as described above, while in a state of isolated operation, the measured value of the reactive power at the grid node 116 changes little. Therefore, the deviation of the reactive power in FIG. 9B remains to be substantially zero from time $t_{20}$ to time $t_{21}$. That is, the deviation of the reactive power does not exceed the threshold value $q_{TH2}$.

At time $t_{22}$, the determined condition has continued from time $t_{21}$ to time $t_{TH2}$. The isolated-operation determination unit 316A determines that the power conversion system itself is in an isolated operation, to disconnect the power conversion system 11 from the power system 17.

Even before the fluctuation in the frequency at the grid node 116 reaches the upper limit value $f_{FRT}$ for requirement for fluctuation in the frequency to continue an operation, the power conversion system 11 according to the second embodiment can determine, from the reactive power, to be in a state of isolated operation. This allows a determination to be made, when the fluctuation in the frequency is smaller than the comparative example, that transition to an isolated operation has occurred, to reduce unnecessary interference with the power system 17, and to shorten a time for detecting an isolated operation.

The isolated-operation determination unit 316A includes the reactive-power-fluctuation determination unit 318 and the storage unit 319 to clearly distinguish between being interconnected with the system and having fluctuation in the frequency of the power system 17, and being in an isolated operation. This allows reliability to be improved for the function of detecting an isolated operation and the function of continuing an operation at a system failure.

Third Embodiment

An isolated-operation determination unit 316B according to a third embodiment is designed so as to determine an isolated operation from the fluctuation in the frequency, in addition to the reactive power. This allows unnecessary interference with the power system 17 to be reduced, and a time for detecting an isolated operation to be shortened, as compared to the comparative example, the first embodiment and the second embodiment.

Figure 10:
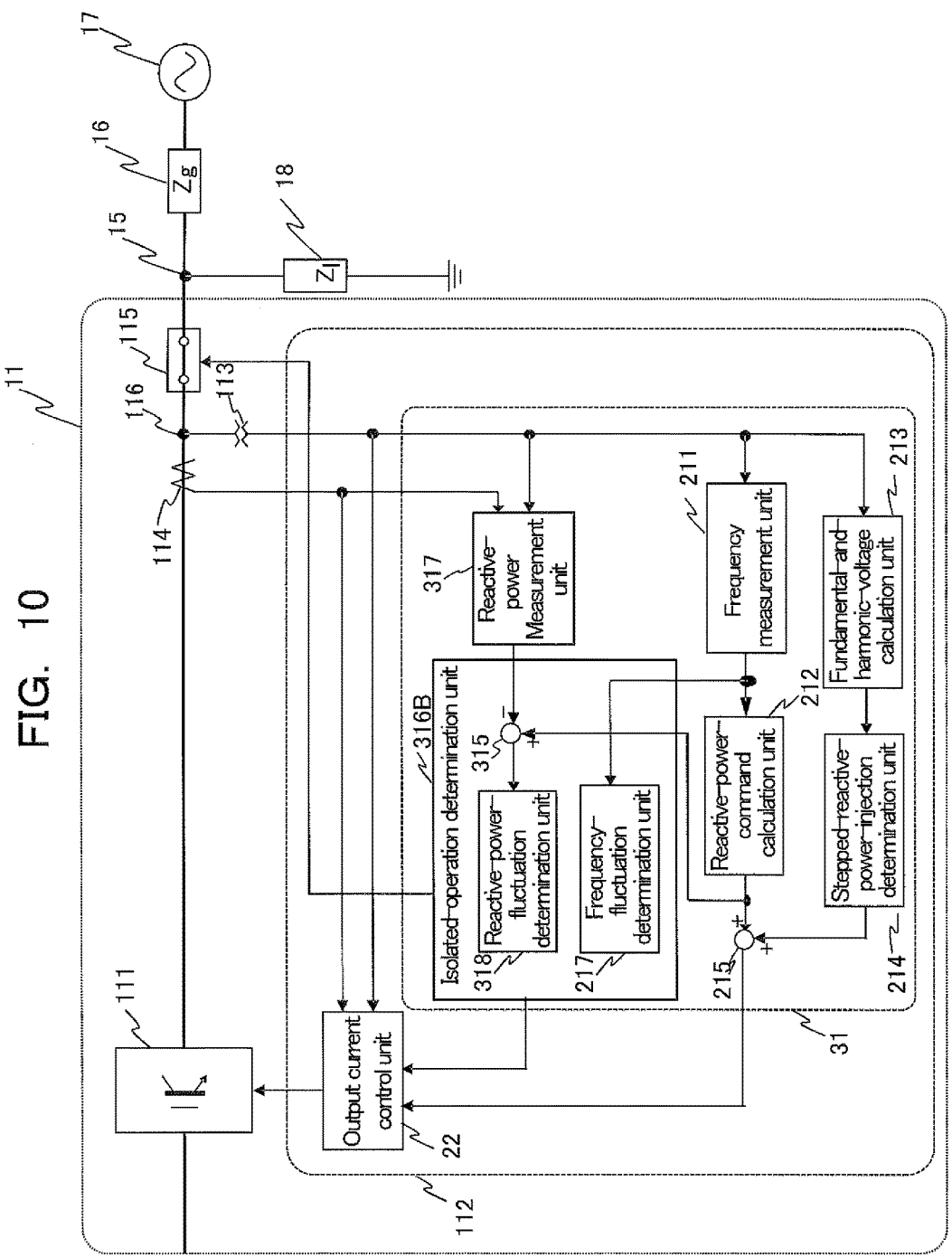
FIG. 10 is a schematic view of configuration showing an isolated-operation detection unit in a third embodiment.

FIG. 10 is a schematic view of configuration showing an isolated-operation detection unit 31 in the third embodiment.

The same elements as those of the isolated-operation detection unit 31 of the first embodiment in FIG. 2 are denoted by the same reference numerals.

As shown in FIG. 10, the isolated-operation detection unit 31 according to the third embodiment is configured to include an isolated-operation detection unit 316B which is different from that in the first embodiment, and the frequency measurement unit 211, the reactive-power-command calculation unit 212, the fundamental-and-harmonic-voltage calculation unit 213, the stepped-reactive-power-injection determination unit 214, the adder 215, and the reactive power measurement unit 317, which are the same as those in the first embodiment.

The isolated-operation determination unit 316B is configured to include the reactive-power-fluctuation determination unit 318 which is the same as that in the first embodiment, and further the frequency-fluctuation determination unit 217 which is the same as that in the comparative example. The isolated-operation determination unit 316B of the third embodiment is designed to determine from the reactive power and the frequency whether or not the power conversion system itself is in an isolated operation.

Figure 11:
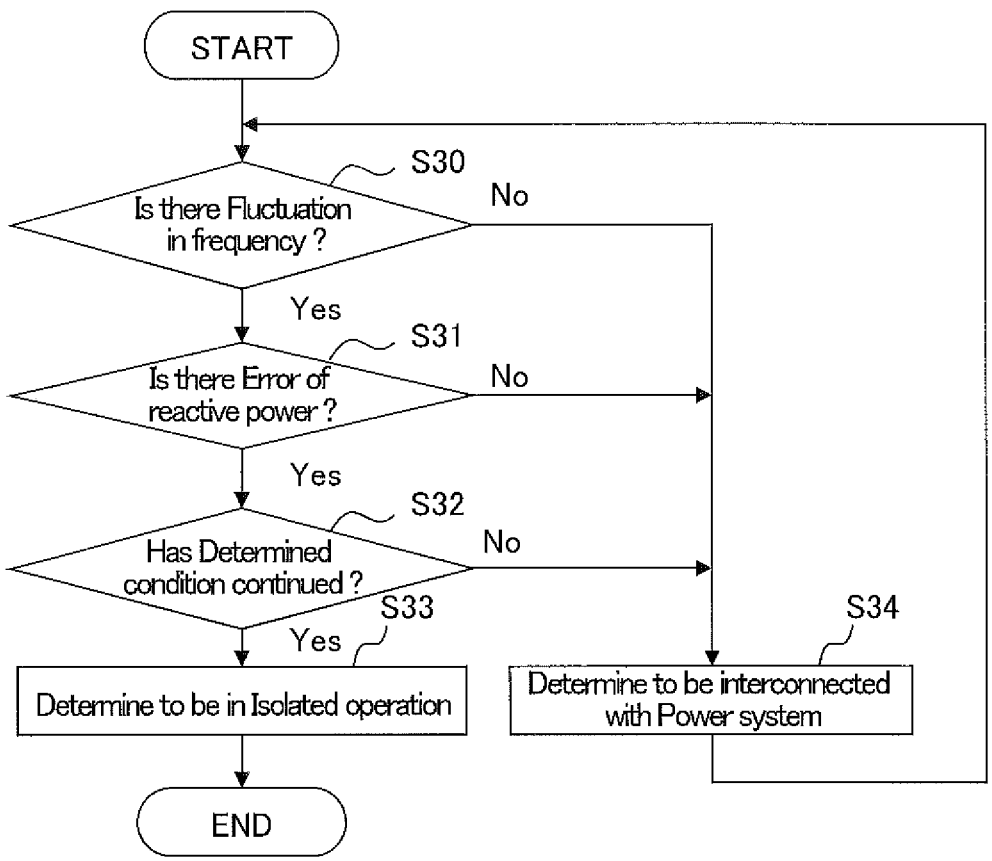
FIG. 11 is a flowchart showing an isolated-operation determination process in the third embodiment.

FIG. 11 is a flowchart showing an isolated-operation determination process of the isolated-operation determination unit 316B in the third embodiment.

Once the power conversion system 11 of the third embodiment is activated, the isolated-operation determination unit 316B starts the isolated-operation determination process.

In step S30, the isolated-operation determination unit 316B, by the frequency-fluctuation determination unit 217, determines fluctuation in the frequency at the grid node 116. The isolated-operation determination unit 316B, if determined that there is fluctuation in the frequency (Yes), performs processing in step S31, and if determined that there is no fluctuation in the frequency (No), performs processing in step S34.

In step S31, the isolated-operation determination unit 316B, by the reactive-power-fluctuation determination unit 318, determines an error of the reactive power. The isolated-operation determination unit 316B, if determined that there is an error of the reactive power (Yes), performs processing in step S32, and if determined that there is no error of the reactive power (No), performs processing in step S34.

In step S32, the isolated-operation determination unit 316B determines whether or not the determined condition has continued over a predetermined period of time. The isolated-operation determination unit 316B, if the determined condition has continued over a predetermined period of time (Yes), performs processing in step S33, and if the determined condition has not continued over a predetermined period of time (No), performs processing in step S34.

In step S33, the isolated-operation determination unit 316B determines that the power conversion system itself is in an isolated operation, to turn off the relay 115 to output a stop signal to the power converter 111, and then ends the process in FIG. 11.

In step S34, the isolated-operation determination unit 316B determines that the power conversion system itself is interconnected with the power system 17, to return to the processing in step S30.

Figure 12A:
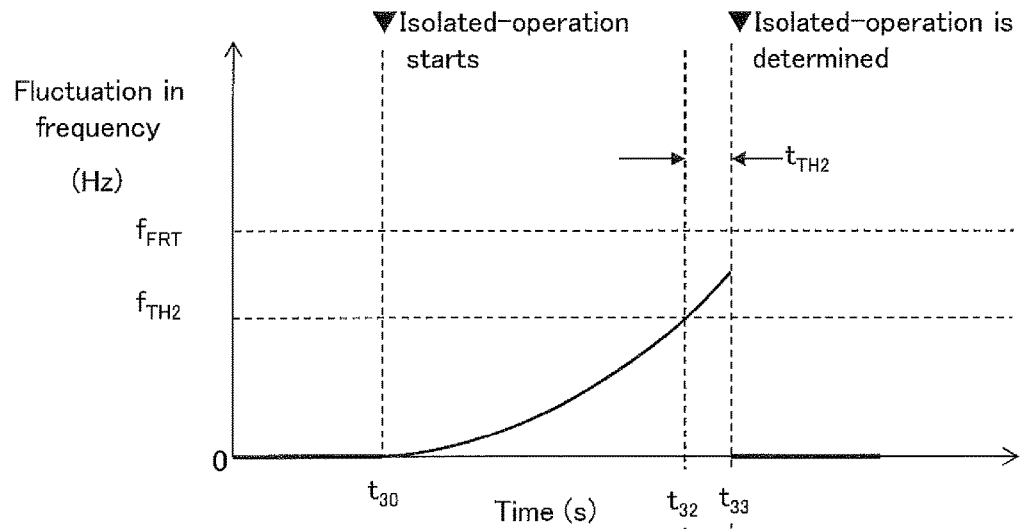
FIGS. 12A and 12B are charts showing an operation of determining an isolated operation in the third embodiment.
Figure 12B:
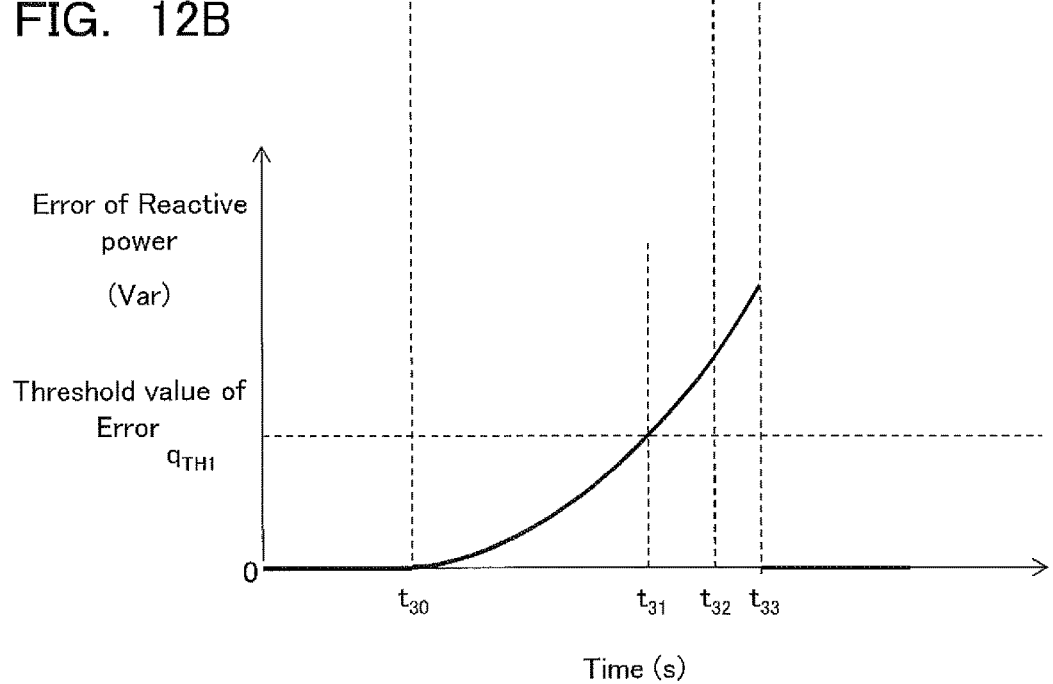

FIGS. 12A and 12B are charts showing an operation of determining an isolated operation in the third embodiment. FIG. 12A is a chart showing the fluctuation in the frequency. The vertical axis in FIG. 12A indicates the fluctuation in the frequency. The horizontal axis in FIG. 12A indicates the time.

FIG. 12B is a chart showing the error of the reactive power. The vertical axis in FIG. 12B indicates the error of the reactive power 12. The horizontal axis in FIG. 12B indicates the time corresponding to that in FIG. 12A.

At time $t_{50}$, the power conversion system 11 transitions to a state of isolated operating. After this, by the reactive-power-command calculation unit 212, the fluctuation in the frequency at the grid node 116 is increased gradually.

At time $t_{31}$, the reactive-power-fluctuation determination unit 318 determines that the calculated error of the reactive power at the grid node 116 exceeds a threshold value $q_{TH1}$.

At time $t_{32}$, the frequency-fluctuation determination unit 217 determines that the fluctuation in the frequency at the grid node 116, which is measured by the frequency measurement unit 211, exceeds the threshold value $f_{TH2}$.

At time $t_{33}$, the frequency-fluctuation determination unit 217 determines that the fluctuation in the frequency and the error of the reactive power at the grid node 116 have continued over a time $t_{TH2}$. This allows the isolated-operation determination unit 316B to determine to be in a state of isolated operation to disconnect the power conversion system 11 from the power system 17, to output a stop signal to the power converter 111.

Since the isolated-operation determination unit 316B determines the isolated operation from the fluctuation in the frequency and the reactive power, the threshold value $f_{TH2}$ can be set to be smaller than the upper limit value $f_{FRT}$ at the grid node 116 for requirement for fluctuation in the frequency to continue an operation. This allows the power conversion system 11 to shorten a time for detecting an isolated operation. Since the isolated-operation determination unit 316B determines an isolated operation further with the fluctuation in the frequency, in addition to the error of the reactive power, such a case is eliminated in which the fluctuation in the reactive power due to variations in the load 18 can lead to incorrectly determining an isolated operation.

Figure 13:
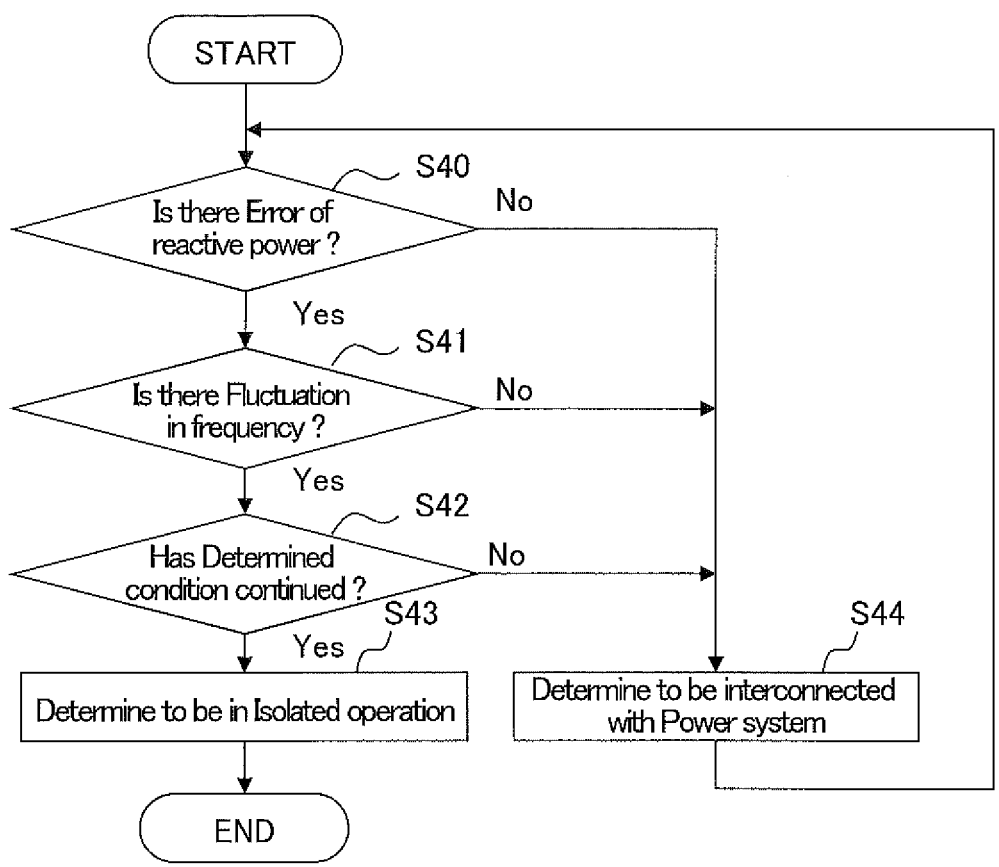
FIG. 13 is a flowchart showing an isolated-operation determination process of a first modification of the third embodiment.

FIG. 13 is a flowchart showing an isolated-operation determination process of the isolated-operation determination unit 316B in a first modification of the third embodiment.

Once the power conversion system 11 of the first modification of the third embodiment is activated, the isolated-operation determination unit 316B starts an isolated-operation determination process.

In step S40, the isolated-operation determination unit 316B, by the reactive-power-fluctuation determination unit 318, determines an error of the reactive power. The isolated-operation determination unit 316B, if determined that there is an error in the reactive power (Yes), performs processing in step S41, and if determined that there is no error in the reactive power (No), performs processing in step S44.

In step S41, the isolated-operation determination unit 316B, by the frequency-fluctuation determination unit 217, determines fluctuation in the frequency at the grid node 116. The isolated-operation determination unit 316B, if determined that there is fluctuation in the frequency (Yes), performs processing in step S42, and if determined that there is no fluctuation in the frequency (No), performs processing in step S44.

Respective processing in steps S42 to S44 are the same as those in steps S32 to S34 in FIG. 11. In step S44, the isolated-operation determination unit 316B determines that the power conversion system itself is interconnected with the power system 17, to return to the processing in step S40.

The isolated-operation determination unit 316B may interchange the orders of determining an error of the reactive power and determining fluctuation in the frequency. This allows the flexibility of processing to be improved.

Figure 14:
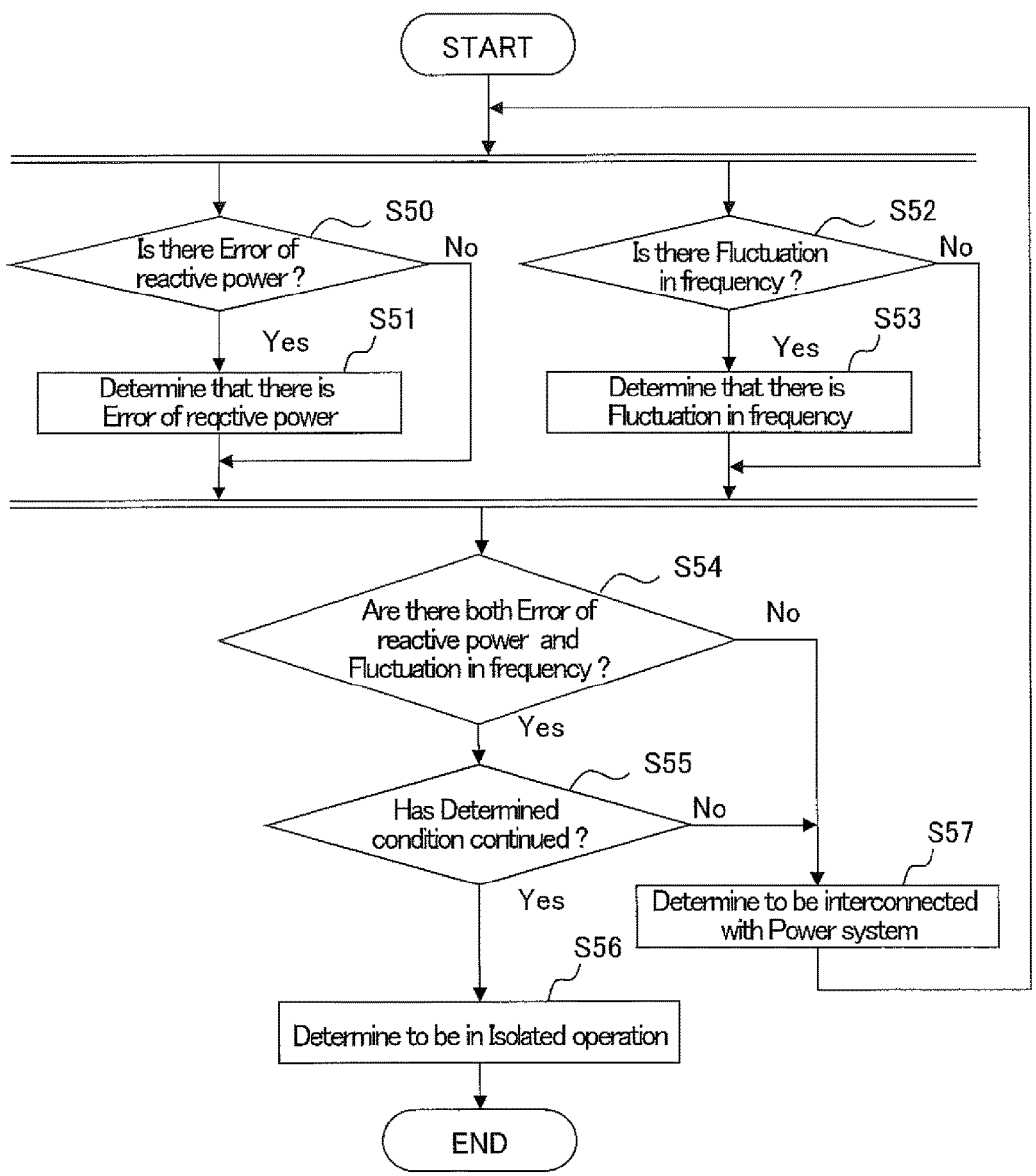
FIG. 14 is a flowchart showing an isolated-operation determination process of a second modification of the third embodiment.

FIG. 14 is a flowchart showing an isolated-operation determination process of the isolated-operation determination unit 316B in the second modification of the third embodiment.

Once the power conversion system 11 of the second modification of the third embodiment is activated, the isolated-operation determination unit 316B starts an isolated-operation determination process.

Once the process is started, the isolated-operation determination unit 316B processes steps S50, S51 and steps S52, S53 in parallel.

In step S50, the isolated-operation determination unit 316B, by the reactive-power-fluctuation determination unit 318, determines an error of the reactive power. The isolated-operation determination unit 316B, if determined that there is an error in the reactive power (Yes), performs processing in step S51, and if determined that there is no error in the reactive power (No), performs processing in step S54.

In step S51, the isolated-operation determination unit 316B determines that there is an error in the reactive power at the grid node 116 (first isolated-operation determination) to perform processing in step S54.

In step S52, the isolated-operation determination unit 316B, by the frequency-fluctuation determination unit 217, determines fluctuation in the frequency at the grid node 116. The isolated-operation determination unit 316B, if determined that there is fluctuation in the frequency (Yes), performs processing in step S53, and if determined that there is no fluctuation in the frequency (No), performs processing in step S54.

In step S53, the isolated-operation determination unit 316B determines that there is fluctuation in the frequency at the grid node 116 (second isolated-operation determination) to perform processing in step S54.

In step S54, the isolated-operation determination unit 316B determines whether or not there are both an error of the reactive power and fluctuation in the frequency at the grid node 116. That is, the isolated-operation determination unit 316B determines the logical AND of the first isolated-operation determination and the second isolated-operation determination. The isolated-operation determination unit 316B, if the determination condition is satisfied (Yes), performs processing in step S55, and if the determination condition is not satisfied (No), performs processing in step S57.

In step S55, the isolated-operation determination unit 316B determines whether or not the determined condition has continued over a predetermined period of time. The isolated-operation determination unit 316B, if the determined condition has continued over a predetermined period of time (Yes), performs processing in step S56, and if the determined condition has not continued over a predetermined period of time (No), performs processing in step S57.

In step S56, the isolated-operation determination unit 316B determines that the power conversion system itself is in an isolated operation, to turn off the relay 115 to output a stop signal to the power converter 111, and then ends the process in FIG. 14.

In step S57, the isolated-operation determination unit 316B determines that the power conversion system itself is interconnected with the power system 17, to return to the parallel processing of steps S50 and S52.

Modifications

The present invention should not be limited to the embodiments as described above, and includes various modifications. For example, the embodiments as described above are those described in detail in order to better illustrate the present invention and should not necessarily be limited to those including all the configurations as described. A part of the configuration of an embodiment may be replaced with the configuration of another embodiment, or the configuration of another embodiment may be added to the configuration of an embodiment. In addition, a part of the configuration of each embodiment may be removed, or added/substituted with another configuration.

Each configuration, processing unit, or the like as described above may be implemented, in part or in its entirety, by hardware such as an integrated circuit. Each configuration, function, or the like as described above may be implemented by software, with a processor interpreting and executing the program for implementing respective functions. Information, such as programs for implementing respective functions, tables, and files, may be stored in a recording device, such as a memory, a hard disk, and an SSD (Solid State Drive), or a recording medium, such as a flash memory card and a DVD (Digital Versatile Disk).

In each embodiment, control lines and information lines shown are those considered to be required for the description, and are not necessarily all the control lines and information lines of the products. In fact, it may be presumed that almost all configurations are connected to each other.

Modifications of the present invention include, for example, (a) to (c) below.

(a) In the first to third embodiments, the command value of the reactive power and the measured value of the reactive power may be replaced, respectively, with those values after a mathematical process, such as a moving average and an integral computation. This allows accuracy of detecting an isolated operation to be improved.

(b) The first and second embodiments use fluctuation of the reactive power to determine an isolated operation. However, without being limited to this, the power conversion system 11 may determine an isolated operation from another measuring element that varies as the reactive power fluctuates, for example, may determine an isolated operation from a reactive current, a power factor or apparent power, instead of the reactive power. This allows the degree of freedom to be improved in the design of the power conversion system 11.

(c) Without being limited to the determination method of an isolated operation of the third embodiment, a deviation of the reactive power at the grid node 116 and fluctuation in the frequency at the grid node 116 in the second embodiment may be combined to determine an isolated operation. This allows the degree of freedom to be improved in the design of the power conversion system 11.

The invention claimed is:

1. A power conversion system for converting DC power to AC power to interconnect with a power system, and injecting reactive power into a grid node to determine an isolated operation, comprising:
   a power converter;
   a voltage sensor that detects an output voltage at the grid node;
   a current sensor that detects an output current at the grid node;
   a relay; and
   at least one processor for executing stored instructions to:
      measure a frequency of the output voltage at the grid node based on a signal of the output voltage detected by the voltage sensor;

measure reactive power at the grid node based on the signal of the output voltage and a signal of the output current at the grid node;

calculate an absolute value of a difference between a command value of the reactive power and the measured value of the reactive power, wherein the absolute value represents an error of the reactive power;

perform a first isolated-operation determination based on the reactive power by determining whether the error of the reactive power exceeds a predetermined value;

determine whether or not the determination of the error of the reactive power exceeding the predetermined value has continued over a predetermined period of time; and when the determination of the error of the reactive power exceeding the predetermined value has continued over the predetermined period of time: (i) determine that the power conversion system is in an isolated operation, (ii) turn off the relay, and (iii) output a stop signal to the power converter.

2. The power conversion system according to claim 1, wherein the at least one processor:

commands reactive power depending on a deviation of the frequency of the output voltage at the grid node; and injects reactive power into the grid node for determining the isolated operation.

3. The power conversion system according to claim 2, further comprising a storage unit that stores measured values of reactive power in the past, and the first isolated-operation determination is performed if an absolute value of a difference between a current value of the reactive power and a value of the reactive power in the past does not exceed a predetermined value over a predetermined period of time.

4. The power conversion system according to claim 1, wherein a frequency of the output voltage, when the at least one processor determines that the power conversion system is in the isolated operation as disconnected from the power system, is lower than an upper limit frequency of the power system for allowing the power conversion system to continue an operation.

5. The power conversion system according to claim 1, when fluctuation in the frequency of the output voltage at the grid node exceeds a threshold value of the frequency, the at least one processor performs a second isolated-operation determination.

6. The power conversion system according to claim 5, wherein a threshold value of the frequency, which is determined by the at least one processor, is lower than an upper limit frequency of the power system for allowing the power conversion system to continue an operation.

7. The power conversion system according to claim 5, after performing the second isolated-operation determination, the at least one processor performs the first isolated-operation determination.

8. The power conversion system according to claim 5, after performing the first isolated-operation determination, the at least one processor performs the second isolated-operation determination.

9. The power conversion system according to claim 5, wherein the at least one processor performs in parallel the first isolated-operation determination and the second isolated-operation determination to determine an isolated-operation based on a logical AND of a result of the first isolated-operation determination and a result of the second isolated-operation determination.

* * * * *